(12) United States Patent
Chalabi et al.

(10) Patent No.: US 10,354,188 B2
(45) Date of Patent: Jul. 16, 2019

(54) EXTRACTING FACTS FROM UNSTRUCTURED INFORMATION

(71) Applicant: Microsoft Technology Licensing, LLC, Redmond, WA (US)

(72) Inventors: Achraf Abdel Moneim Tawfik Chalabi, Cairo (EG); Ahmed Mohamed Emad Morsi Abdelbaki, Bonn (DE); Brandon Robert Anderson, Kirkland, WA (US); Eslam Kamal Abdel-Aal Abdel-Reheem, Cairo (EG); Deqing Chen, Bellevue, WA (US); Michel Naim Naguib Gerguis, Cairo (EG); Sayed Hassan Sayed Abdelaziz, Redmond, WA (US); Yuval Yehezkel Marton, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 359 days.

(21) Appl. No.: 15/226,807

(22) Filed: Aug. 2, 2016

(65) Prior Publication Data

US 2018/0039695 A1 Feb. 8, 2018

(51) Int. Cl.
*G06F 17/30* (2006.01)
*G06N 5/02* (2006.01)

(52) U.S. Cl.
CPC .................................. *G06N 5/022* (2013.01)

(58) Field of Classification Search
None
See application file for complete search history.

(56) References Cited

U.S. PATENT DOCUMENTS

| 6,076,088 | A  | 6/2000  | Paik et al.      |
| 6,188,976 | B1 | 2/2001  | Ramaswamy et al. |
| 6,463,430 | B1 | 10/2002 | Brady et al.     |
| 7,536,389 | B1 | 5/2009  | Prabhakar et al. |
| 7,941,421 | B2 | 5/2011  | Tiyyagura        |

(Continued)

FOREIGN PATENT DOCUMENTS

| WO | 03014975 A1   | 2/2003 |
| WO | 2007069244 A2 | 6/2007 |

(Continued)

OTHER PUBLICATIONS

Dingli, et al., "Automatic Semantic Annotation using Unsupervised Information Extraction and Integration," in K-CAP Workshop on Knowledge Markup and Semantic Annotation, Oct. 2003, 9 pages.

(Continued)

*Primary Examiner* — Alex Gofman
(74) *Attorney, Agent, or Firm* — Rainier Patents, P.S.

(57) ABSTRACT

A computer-implemented technique is described herein for extracting facts from unstructured text documents provided by one or more information sources. The technique uses a pipeline to perform this operation that involves, at least in part, providing a corpus of information items, extracting candidate facts from the information items, merging synonymous argument values associated with the candidate facts, organizing the candidate facts into relation clusters, and assessing the confidence level of the candidate facts within the relation clusters.

20 Claims, 22 Drawing Sheets

(56) References Cited

U.S. PATENT DOCUMENTS

| | | | |
|---|---|---|---|
| 8,001,130 | B2 | 8/2011 | Wen et al. |
| 8,117,203 | B2 | 2/2012 | Gazen et al. |
| 8,412,652 | B2 | 4/2013 | Yu et al. |
| 8,414,652 | B2 | 4/2013 | Moumene et al. |
| 8,484,245 | B2 | 7/2013 | Ha-Thuc et al. |
| 8,504,490 | B2 | 8/2013 | Nie et al. |
| 8,560,485 | B2 | 10/2013 | Labrou et al. |
| 8,713,007 | B1 | 4/2014 | Korolev et al. |
| 8,768,960 | B2 | 7/2014 | Hu et al. |
| 8,788,442 | B1 | 7/2014 | Sculle et al. |
| 8,825,471 | B2 | 9/2014 | Betz et al. |
| 8,909,645 | B2 | 12/2014 | Eden et al. |
| 8,938,410 | B2 | 1/2015 | Cafarella et al. |
| 9,002,852 | B2 | 4/2015 | Farahat et al. |
| 9,177,289 | B2 | 11/2015 | Roy et al. |
| 9,256,422 | B2 | 2/2016 | Grechanik |
| 2003/0212543 | A1* | 11/2003 | Epstein .................. G06F 17/271 704/9 |
| 2003/0225763 | A1 | 12/2003 | Guilak et al. |
| 2007/0112756 | A1 | 5/2007 | Wen et al. |
| 2011/0022550 | A1 | 1/2011 | Pennacchiotti et al. |
| 2011/0029384 | A1 | 2/2011 | Wei et al. |
| 2011/0307435 | A1* | 12/2011 | Overell .................. G06F 17/278 706/46 |
| 2012/0197862 | A1 | 8/2012 | Woytowitz et al. |
| 2013/0035931 | A1 | 2/2013 | Ferrucci et al. |
| 2013/0066870 | A1 | 3/2013 | Somasundaran et al. |
| 2013/0191915 | A1 | 7/2013 | Antonakakis et al. |
| 2015/0006333 | A1 | 1/2015 | Silveira et al. |
| 2015/0051900 | A1 | 2/2015 | Kimelfeld et al. |
| 2015/0154193 | A1 | 6/2015 | Dave et al. |
| 2015/0178273 | A1 | 6/2015 | Hakkani-Tur et al. |
| 2015/0286629 | A1 | 10/2015 | Abdel-Reheem et al. |
| 2016/0042276 | A1 | 2/2016 | Lightner et al. |
| 2016/0092557 | A1 | 3/2016 | Stojanovic et al. |
| 2016/0179934 | A1 | 6/2016 | Stubley et al. |
| 2016/0188673 | A1* | 6/2016 | Maughan .............. G06F 16/435 707/733 |
| 2017/0091313 | A1 | 3/2017 | Chalabi et al. |
| 2018/0005331 | A1* | 1/2018 | Wang ..................... G06Q 40/08 |

FOREIGN PATENT DOCUMENTS

| | | |
|---|---|---|
| WO | 2008074486 A2 | 6/2008 |
| WO | 2015077942 A1 | 6/2015 |

OTHER PUBLICATIONS

Qiu, et al., "Relation Extraction from Chinese News Web Documents Based on Weakly Supervised Learning," in Proceedings of the International Conference on Intelligent Networking and Collaborative Systems, Nov. 2009, 7 pages.

Pande, et al., "Domain Specific Facts Extraction Using Weakly Supervised Active Learning Approach," in Proceedings of the IEEE/WIC/ACM International Conferences on Web Intelligence (WI) and Intelligent Agent Technology (IAT), Nov. 2013, 6 pages.

Etzioni, et al., "Unsupervised named-entity extraction from the Web: An experimental study," in Artificial Intelligence, vol. 165, Issue 1, Jun. 2005, 44 pages.

Rozenfeld, et al., "High-Performance Unsupervised Relation Extraction from Large Corpora," in Proceedings of the Sixth International Conference on Data Mining, Dec. 2006, 6 pages.

Ji, et al., "Knowledge Base Population: Successful Approaches and Challenges," in Proceedings of the 49th Annual Meeting of the Association for Computational Linguistics: Human Language Technologies, vol. 1, Jun. 2011, 11 pages.

Sun, et al., "Semi-supervised Relation Extraction with Large-scale Word Clustering," in Proceedings of the 49th Annual Meeting of the Association for Computational Linguistics: Human Language Technologies, vol. 1, Jun. 2011, 9 pages.

Yates, et al., "TextRunner: Open Information Extraction on the Web," in Proceedings of Human Language Technologies: The Annual Conference of the North American Chapter of the Association for Computational Linguistics: Demonstrations, Apr. 2007, 3 pages.

Fader, et al., "Identifying Relations for Open Information Extraction," in Proceedings of the Conference on Empirical Methods in Natural Language Processing, Jul. 2011, 12 pages.

"Open Information Extraction," available at <<http://ai.cs.washington.edu/projects/open-information-extraction>>, University of Washington, Seattle, WA, accessed on Jul. 17, 2016, 5 pages.

Chalabi, et al., "Domain-Specific Unstructured Text Retrieval," U.S. Appl. No. 14/867,620, filed Sep. 28, 2015, 32 pages.

Search Report and Written Opinion for PCT/US2016/052732, dated Nov. 29, 2016, 15 pages.

Pasca, et al., "Organizing and Searching the World Wide Web of Facts—Step One: the One-Million Fact Extraction Challenge," in Proceedings of the 21st National Conference on Artificial Intelligence, Jul. 2016, 6 pages.

"Non-Final Office Action Issued in U.S. Appl. No. 14/867,620", dated Jan. 26, 2018, Jan. 26, 2018, 12 Pages.

Chakrabarti, et al., "Enhanced Hypertext Categorization using Hyperlinks", In the ACM SIGMOD Record, vol. 27, Issue 2, Jun. 30, 1998, pp. 307-318.

Craven, et al., "Learning to Construct Knowledge Bases From the World Wide Web", In Journal of Artificial Intelligence, vol. 118, Issue 1-2, Apr. 1, 2000, pp. 69-113.

Gabrilovich, et al., "Computing Semantic Relatedness using Wikipedia-based Explicit Semantic Analysis", In Proceedings of the 20th International Joint Conference on Artificial Intelligence, vol. 07, Jan. 6, 2007, pp. 1606-1611.

"International Preliminary Report on Patentability Issued in PCT Application No. PCT/US2016/052562", dated Mar. 8, 2018, 10 Pages.

"International Search Report and Written Opinion Issued in PCT Application No. PCT/US2016/052562", dated Dec. 13, 2016, 13 Pages.

"Second Written opinion Issued in PCT Application No. PCT/US2016/052562", dated Dec. 11, 2017, 10 Pages.

Wang, et al., "Using Wikipedia for Co-Clustering Based Cross-domain Text Classification", In Eighth IEEE International Conference on International Data Mining, Dec. 15, 2008, pp. 1085-1090.

Xiang, et al., "Bridging Domains Using World Wide Knowledge for Transfer Learning", In Proceedings of IEEE Transactions on Knowledge and Data Engineering, vol. 22, Issue 6, Jun. 2010, pp. 770-783.

* cited by examiner

EXTRACTING FACTS FROM UNSTRUCTURED INFORMATION

BACKGROUND

Many computer-implemented systems rely on knowledge bases to provide intelligent services to end users. For example, a Question Answering System or Virtual Agent may attempt to answer user queries by consulting a knowledge base. The performance of any such system depends in large part on the coverage and accuracy of the facts in its underlying knowledge base. Developers therefore strive to develop knowledge bases having wide coverage and high accuracy.

The task of developing a knowledge base is time-consuming, expensive, and prone to error. Further, the task of developing a knowledge base may never reach a point of completion. For instance, a developer that provides a knowledge base regarding businesses within a particular city needs to continually update the facts contained therein to keep abreast of the opening and closing of businesses.

Some developers have attempted to expedite the development process by automatically extracting facts from pre-existing structured (or semi-structured) information sources, such as data stores that provide information in tables. But these sources may have limited informational scope. Further, these solutions are narrowly engineered to extract facts from specific data structures, and, as such, they may not scale to multiple subject matter domains and/or multiple sources. Further, some solutions operate in a relatively slow and cumbersome manner, and therefore cannot keep abreast of rapidly changing information. Further still, some solutions do not offer techniques for verifying the accuracy of extracted facts in a reliable, timely and cost-efficient manner. The above-noted shortcomings are cited by way of example, not limitation; other solutions may suffer from yet other deficiencies.

SUMMARY

A computer-implemented technique is described herein for extracting facts from unstructured information items provided by one or more sources. Unstructured information refers to information that, at least in part, does not conform to any a priori organizational scheme, such as free text provided by news articles. The technique uses a pipeline to perform its operation that involves, at least in part, providing (e.g., creating) a corpus of information items, extracting candidate facts from the information items, merging synonymous argument values associated with the candidate facts, organizing the candidate facts into relation clusters, and assessing the relevance of the candidate facts within the relation clusters. Each fact corresponds to a relation triple that includes a first named entity that operates as a subject, a second named entity that operates as an object, and a relation value that expresses a relationship between the first named entity and the second named entity.

According to one advantage, the technique greatly enlarges the universe of available information from which facts can be extracted by processing unstructured information. In doing so, the technique solves a significant technical problem because unstructured information, in its natural state, contains no simple markers that point out what pieces of information constitute facts, and what facts qualify as accurate and significant facts. According to another advantage, the technique is scalable because it provides a general technical solution that can be quickly applied to different subject matter domains and sources. Many other advantages of the technique are set forth herein.

The above technique can be manifested in various types of systems, devices, components, methods, computer-readable storage media, data structures, graphical user interface presentations, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

Figure 1:
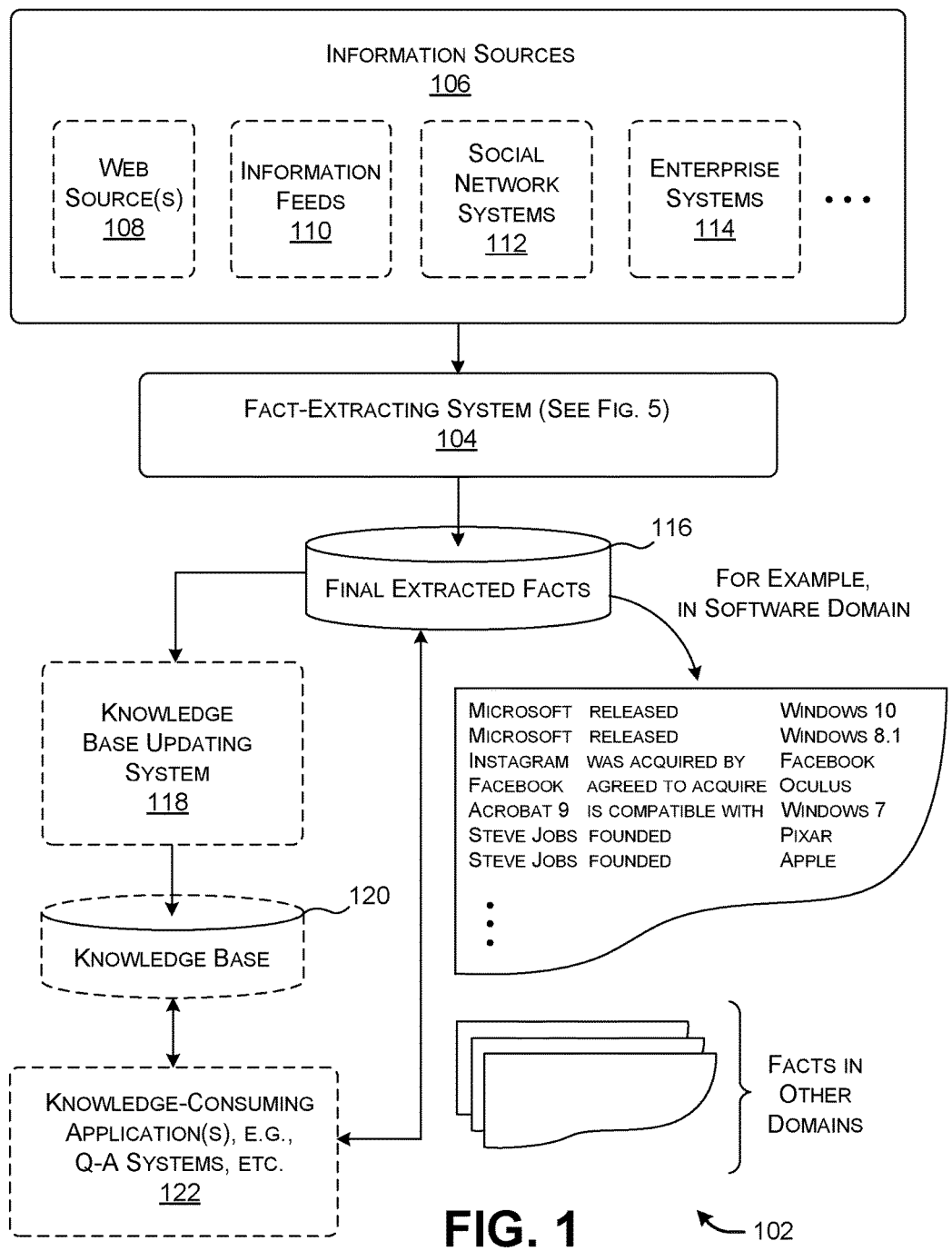
FIG. 1 provides a logical depiction of an environment in which a fact-extracting system extracts facts from unstructured information items provided by any number of sources. The environment also illustrates one or more knowledge-consuming applications that use the extracted facts.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure is organized as follows. Section A describes a computer-implemented system for extracting facts from unstructured information items provided by any number of sources. Section B sets forth illustrative methods which explain the operation of the system of Section A. And Section C describes illustrative computing functionality that can be used to implement any aspect of the features described in Sections A and B.

As a preliminary matter, some of the figures describe concepts in the context of one or more structural components, also referred to as functionality, modules, features, elements, etc. In one implementation, the various components shown in the figures can be implemented by software running on computer equipment, or hardware (e.g., chip-implemented logic functionality), etc., or any combination thereof. In one case, the illustrated separation of various components in the figures into distinct units may reflect the use of corresponding distinct physical and tangible components in an actual implementation. Alternatively, or in addition, any single component illustrated in the figures may be implemented by plural actual physical components. Alternatively, or in addition, the depiction of any two or more separate components in the figures may reflect different functions performed by a single actual physical component. Section C provides additional details regarding one illustrative physical implementation of the functions shown in the figures.

Other figures describe the concepts in flowchart form. In this form, certain operations are described as constituting distinct blocks performed in a certain order. Such implementations are illustrative and non-limiting. Certain blocks described herein can be grouped together and performed in a single operation, certain blocks can be broken apart into plural component blocks, and certain blocks can be performed in an order that differs from that which is illustrated herein (including a parallel manner of performing the blocks). In one implementation, the blocks shown in the flowcharts can be implemented by software running on computer equipment, or hardware (e.g., chip-implemented logic functionality), etc., or any combination thereof.

As to terminology, the phrase "configured to" encompasses various physical and tangible mechanisms for performing an identified operation. The mechanisms can be configured to perform an operation using, for instance, software running on computer equipment, hardware (e.g., chip-implemented logic functionality), etc., or any combination thereof.

The term "logic" encompasses various physical and tangible mechanisms for performing a task. For instance, each operation illustrated in the flowcharts corresponds to a logic component for performing that operation. An operation can be performed using, for instance, software running on computer equipment, hardware (e.g., chip-implemented logic functionality), etc., or any combination thereof. When implemented by computing equipment, a logic component represents an electrical component that is a physical part of the computing system, in whatever manner implemented.

Any of the storage resources described herein, or any combination of the storage resources, may be regarded as a computer-readable medium. In many cases, a computer-readable medium represents some form of physical and tangible entity. The term computer-readable medium also encompasses propagated signals, e.g., transmitted or received via a physical conduit and/or air or other wireless medium, etc. However, the specific terms "computer-readable storage medium" and "computer-readable storage medium device" expressly exclude propagated signals per se, while including all other forms of computer-readable media.

The following explanation may identify one or more features as "optional." This type of statement is not to be interpreted as an exhaustive indication of features that may be considered optional; that is, other features can be considered as optional, although not explicitly identified in the text. Further, any description of a single entity is not intended to preclude the use of plural such entities; similarly, a description of plural entities is not intended to preclude the use of a single entity. Further, while the description may explain certain features as alternative ways of carrying out identified functions or implementing identified mechanisms, the features can also be combined together in any combination. Finally, the terms "exemplary" or "illustrative" refer to one implementation among potentially many implementations.

A. Illustrative System

A.1. Overview

FIG. 1 presents a logical depiction of an environment 102 in which a fact-extracting system 104 extracts facts from unstructured information provided by one or more sources. Unstructured information refers to information that does not conform to any a priori organizational scheme. For example, a free-text news article represents an instance of unstructured information. Note, however, that the fact-extracting system 104 can also process semi-structured information. Structured and semi-structured information refer to information that conforms to some organizational scheme, to some extent. A table is an example of structured information. A markup language document or an Email message may correspond to an example of semi-structured information. The fact-extracting system 104 can also process hybrid information, a part of which is structured (or semi-structured) and a part of which is unstructured.

An instance of information is referred to herein as an information item. The information item may refer to any unit of information that contains text, such as a document, web page, message, etc. To facilitate explanation, the simplifying assumption will be made below that each information item includes, at least in part, some unstructured or semi-structured information.

The fact-extracting system 104 receives information items from one or more information sources 106 (referred to in the plural below). A source refers an origin of instances of unstructured information. The information sources 106 can include World Wide Web ("web") sources 108 accessible via a wide area network (e.g., the Internet), such as server computing devices ("servers") that provide web pages, data stores that provide archived documents, etc. The information sources 106 can also include one or more information feeds 110, such as Rich Site Summary (RSS) news-related feeds. The information sources 106 can also include one or more social network systems 112. The social network systems 112 provide information items in the form of postings, messages (e.g., tweets), etc. When applied in an organizational setting, the information sources 106 can also include one or more enterprise systems 114; for instance, the enterprises systems 114 can include a repository of documents maintained on a server of a particular company. The above-noted examples of information sources 106 are cited by way of example, not limitation; other implementations can receive information items from other sources.

Overall, the fact-extracting system 104 can leverage a relatively large body of information by virtue of the fact that it can successfully process unstructured information (there being much more unstructured information in the digital domain compared to structured information), and because it can receive information items from a wide variety of source(s) and different kinds of information items. The great wealth of digital information available to fact-extracting system 104 is one factor that contributes to its success in extracting plentiful and accurate facts.

The fact-extracting system 104 stores its facts in a data store 116. Each fact refers to a relation triple that includes three values, <entity1 value, relation value, entity2 value>. The entity1 value is an argument value that corresponds to a first named entity, and which serves as a subject. The entity2 value is an argument value that corresponds to a second named entity, and which serves as an object. The relation value describes a relationship between the subject and the object. For example, in the software-related domain, one relation triple corresponds to <"Steve Jobs," "founded," "Pixar">. This relation triple conveys that a person named "Steve Jobs" (corresponding to the entity1 argument value) founded a company named "Pixar" (corresponding to the entity2 argument value). The verb linking the argument values defines the relation, in this case, a relation having the value "founded."

From a high-level perspective, the fact-extracting system 104 operates by receiving a collection of information items from the information sources 106, identifying named entities in the information items, extracting raw or candidate facts (corresponding to candidate relation triples) from the information items, conflating synonymous argument values within the candidate facts, organizing the candidate facts into relation clusters, and assessing the relevance of the candidate facts in the relation clusters. The fact-extracting system 104 outputs final extracted facts, which constitute candidate facts that have been assessed as being relevant by a trained model.

An optional knowledge base updating system ("updating system") 118 can add the final extracted facts to a knowledge base, provided in a data store 120. The knowledge base can organize existing facts using any preexisting data structure (such as a graph data structure) and using any preexisting classificatory ontology. In one case, a developer can use the updating system 118 to manually add the final extracted facts to the knowledge base. In another case, the updating system 118 can automatically add the final extracted facts to the knowledge base.

In the latter case (in which automatic updating is performed), the updating system 118 can map the final extracted facts to the existing ontology of the knowledge base to produce transformed facts, and then add the transformed facts to the knowledge base. For instance, the updating system 118 can use a mapping table and/or a similarity-assessment component to map values (and value types) identified by the fact-extracting system 104 to equivalent existing values (and value types) used by the knowledge base, if any. The similarity-assessment component (not shown) can perform the mapping operation by determining an extent of overlap between the final extracted facts and the existing facts in the knowledge base. The extent of overlap, in turn, provides guidance on how the final extracted facts relate to the existing facts in the knowledge base. Or the similarity-assessment component can perform the mapping operation using a machine-trained model, and so on.

In some cases, the updating system 118 uses the final extracted facts to add new relations between existing entities within the knowledge base. In other cases, the updating system 118 uses the final extracted facts to add new entity instances and/or entity types to the knowledge base. In other cases, the updating system 118 uses the final extracted facts to update stale facts (and incorrect facts) within the knowledge base.

One or more knowledge-consuming applications 122 (referred to in the plural below) can provide services that directly utilize the final extracted facts in the data store 116 and/or the information provided in the knowledge base in the data store 120. For instance, a Question Answering System can use the knowledge base to provide an answer to a question posed by an end user. In another case, a recommendation system can use the knowledge base to provide product recommendations to an end user. In another case, a Personal Digital Assistant system can use the knowledge base to assist the end user in scheduling a meeting or making a reservation, and so on.

Figure 2:
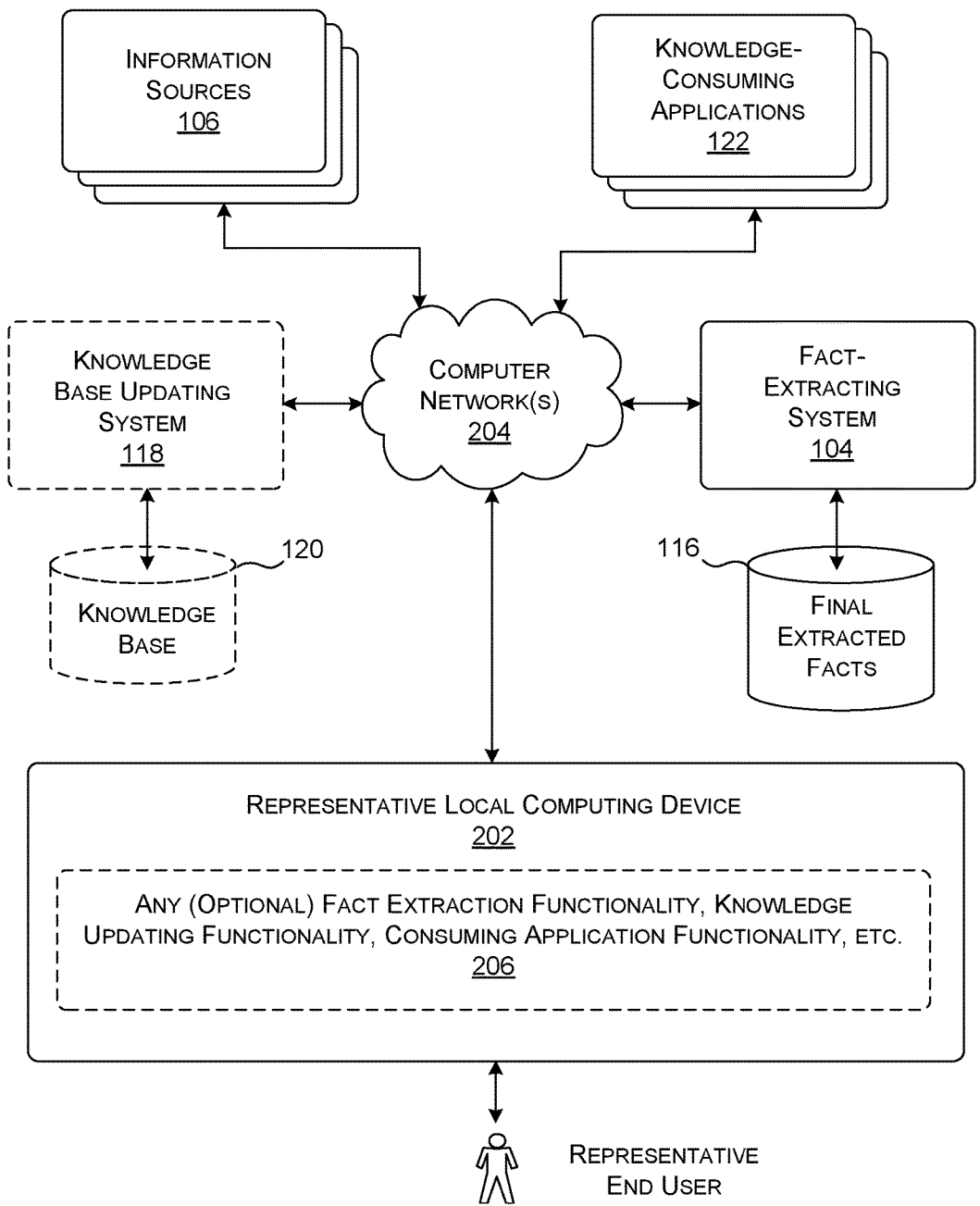
FIG. 2 shows one implementation of the environment of FIG. 1, built using one or more computing devices.

FIG. 2 shows one implementation of the environment 102 of FIG. 1 built using one or more computing devices. For instance, the fact-extracting system 104 can be implemented by one or more server computing devices and other computing equipment (e.g., routing equipment, load balancing equipment, etc.). Likewise, each of the information sources 106, the updating system 118, and the knowledge-consuming applications 122 can be implemented by one or more server computing devices and other computing equipment. An end user can use a local computing device 202 to interact with any knowledge-consuming application 122 via a computer network 204. Or an end user can directly interact with the final extracted facts provided in the data store 116 or the knowledge base provided in the data store 120. The local computing device 202 may correspond to any computing equipment, such as a personal computing device, a game console device, any kind of handheld computing device (such as a smartphone), a wearable computing device, and so on. The computer network 204 can correspond to a wide area network (e.g., the Internet), a local area network, a peer-to-peer network, one or more point-to-point links, and so on, or any combination thereof.

In other implementations, each local computing device 202 can include functionality 206 which implements any of the functions performed by the fact-extracting system 104, the updating system 118, and/or the knowledge-consuming application 122. For instance, the local computing device 202 can provide a local knowledge-consuming application which interacts with a remote knowledge base provided by the data store 120. Or the local computing device 202 can perform one or more aspects of the operation of the fact-extracting system 104 itself. In addition, the local computing device 202 can locally provide one or more of the information sources 106.

Figure 3:
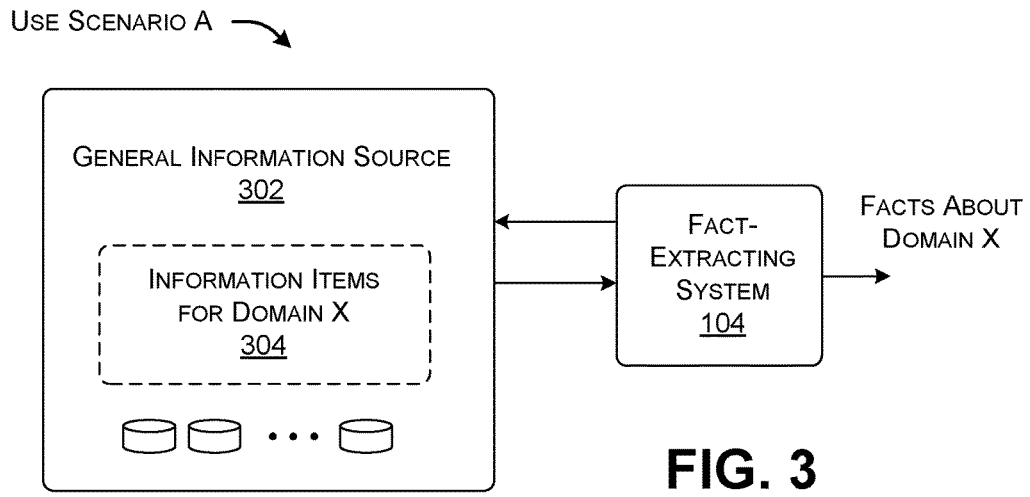
FIGS. 3 and 4 show two respective use scenarios to which the environment of FIG. 1 can be applied.
Figure 4:
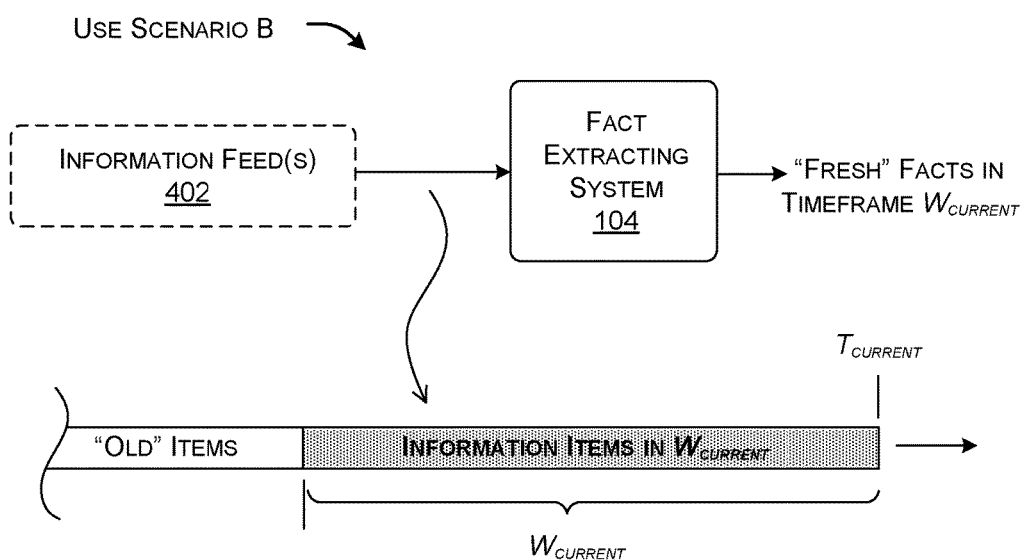

FIGS. 3 and 4 show two respective use scenarios to which the environment 102 of FIG. 1 can be applied. In the case of FIG. 3, the fact-extracting system 104 interacts with a general source 302 of information items to extract a subset of information items 304 therefrom. For example, the general source 302 may correspond to the World Wide Web which hosts content directed to a great variety of subject matter domains. The subset of information items 304 pertains to a particular subject matter domain X. A subject matter domain can have any scope. For instance, one subject matter domain corresponds to sports-related content, whereas a narrower subject matter domain corresponds to soccer. The fact-extracting system 104 extracts facts that pertain to domain X because it culls these facts from information items that pertain to domain X. For example, the fact-extracting system 104 shown in FIG. 1 extracts facts related to software because it operates on information items that pertain to a software-related domain.

The fact-extracting system 104 is scalable because it can be quickly and efficiently configured to operate in a particular domain with only a small amount of manual supervision, if any. Thereafter, the fact-extracting system 104 can be quickly and efficiently extended to operate in another domain, again with only a small amount of manual supervision, if any. For example, the fact-extracting system 104 can be developed for the software-related domain and thereafter extended to a sport-related domain with only a small amount of manual effort. Later subsections provide details that elaborate on the above statements.

In the case of FIG. 4, the fact-extracting system 104 receives one or more information feeds 402, such as one or more RSS feeds. Each feed provides a dynamic stream of information items, such as news stories. The fact-extracting system 104 operates on a collection of information items received via the information feeds 402, and extracts facts therefrom. For instance, at a given time $T_{current}$, the fact-extracting system 104 operates on a collection of information items received in a time window $W_{current}$. The time window $W_{current}$ can have any duration and can be demarcated by any starting time and stopping time. For example, the time window $W_{current}$ can refer to a sliding window spanning the last 24 hours, e.g., where the window ends at the current time $T_{current}$.

The collection of documents encompassed by $W_{current}$ can correspond to any topic or range of topics. In one case, a user can manually choose at least one information feed that provides information items relating to a particular subject matter domain. For example, a user can chose an RSS feed that provides news items relating to a sports-related domain. In another case, a user can manually choose at least one information feed that provides information items having no affiliation with a subject matter domain, or only a weak affiliation with a subject matter domain. Alternatively, or in addition, the user can choose an information feed that spans multiple domains, or the user can choose plural feeds pertaining to different respective domains. In these cases, the domain(s) of the information items can be considered temporal in nature, rather than, or in addition to, topical in nature; that is, the domain(s) of the information items refer, at least in part, to any content received with the time window $W_{current}$, which may or may not also have a topical consistency. Further note that, even though the information items in $W_{current}$ may have no a priori topical constraints, they may have de facto topical constraints. For example, the news items received during the last 24 hours will be clustered around the significant events that have happened in that day. For example, a topic-neutral news feed may take on a sports-related theme during the Olympic games.

Figure 5:
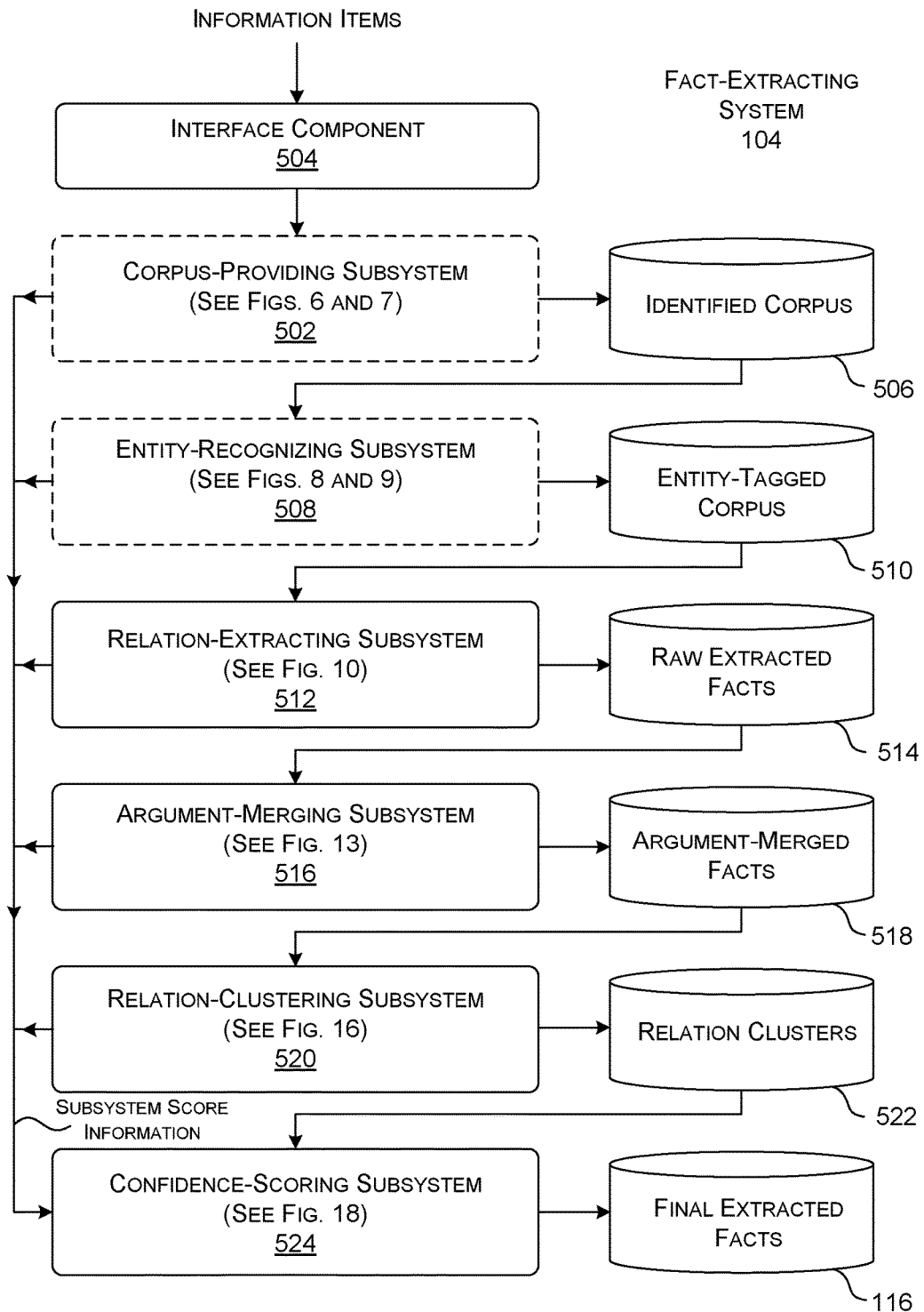
FIG. 5 shows one illustrative implementation of the fact-extracting system of FIG. 1.

FIG. 5 shows one illustrative implementation of the fact-extracting system 104 of FIG. 1. The fact-extracting system 104 is structured as a pipeline of subsystems that perform different respective tasks. However, other implementations need not perform the tasks in the same manner shown in FIG. 5. For example, other implementations can use a pipeline that adopts a different order of tasks compared to that shown in FIG. 5. Alternatively, or in addition, other implementations can perform one or more tasks shown in FIG. 5 in a parallel manner. Alternatively, or in addition, other implementations can break any single task into plural phases, and perform those phases at different respective stages of the pipeline shown in FIG. 5.

This introductory subsection provides an overview of the subsystems shown in FIG. 5. Later subsections provide further details regarding the respective subsystems.

First, a corpus-providing subsystem 502 extracts a collection of information items from the information sources 106 via an interface component 504. The corpus-providing subsystem 502 can operate in different modes. In a first case, the corpus-providing subsystem 502 operates per the scenario of FIG. 3, that is, by extracting a subset of information items 304 pertaining to a desired domain from a general source 302. In a second mode, the corpus-providing subsystem 502 operates per the scenario of FIG. 4, that is, by receiving a collection of information items from one or more information feeds 402. The interface component 504 represents whatever mechanism the fact-extracting system 104 receives information items from an information source, such as a network interface for receiving digital information over the computer network 204. The corpus-providing subsystem 502 stores the collection of information items that are received in a data store 506. The collection of information items constitutes an identified corpus, according to the terminology used herein. As a general point, any reference in this description to "storing" information items can refer to storing the actual information items themselves, or may refer to storing references (e.g., URLs) that point to the information items.

An entity-recognizing subsystem 508 recognizes entity names in the identified corpus, to provide an entity-tagged corpus. An entity name generally corresponds to particular person, place, event, thing, etc., often associated with a proper noun. The entity-recognizing subsystem 508 operates by identifying each entity name in the identified corpus and tagging that entity name with its type (class). For example, the entity-recognizing subsystem 508 identifies the text "Steve Jobs" as corresponding to a person-type named entity, and the text "Apple Computer" as corresponding to a company-type named entity. The entity-recognizing subsystem 508 stores the entity-tagged corpus in a data store 510.

A relation-extracting subsystem 512 identifies relation triples in the entity-tagged corpus to provide a set of original identified relation triples, henceforth referred to as raw or candidate facts. As described above, each relation triple includes a first argument value (entity1) associated with a first named entity that serves as a subject (e.g., Steve Jobs), a second argument value (entity2) associated with a second named entity that serves as an object (e.g., Pixar), and a relation value (such as "founded") corresponding to a relationship between the first named entity and the second named entity. The relation-extracting subsystem 512 stores the raw extracted facts in a data store 514.

An argument-merging subsystem 516 identifies argument values that have different respective lexical forms but which nevertheless correspond to the same named entity. For instance, the argument-merging subsystem 516 can determine that "Bill Gates" and "William Gates" and "BG" refer to the same person. The argument-merging subsystem 516 can then replace each group of synonymous argument values with a canonical value, such as "Bill Gates" in the above example. Overall, the argument-merging subsystem produces argument-merged facts, which it stores in a data store 518.

The argument-merging subsystem 516 also serves as an illustration of the above comment regarding the structure of the pipeline as a whole. In other implementations, the fact-extracting subsystem 104 can perform the argument-merging function at a different juncture in the pipeline, compared to its position within the pipeline shown in FIG. 5. Other implementations can perform the fact-extracting operation in multiple stages at different respective junctures of the pipeline.

A relation-clustering subsystem 520 organizes the argument-merged facts into one or more relation clusters, which it stores in a data store 522. Each relation cluster combines relation triples associated with a same type of first argument value, a same type of second argument value, and a same relation value. For example, one type of relation cluster can contain relation triples in which the first argument type correspond to a company class, the second argument type also corresponds to a company class, and the relation value correspond to the action "acquire." For example, one such relation triple in that relation clusters corresponds to <"Facebook," "acquired," "Instagram">.

A confidence-scoring subsystem 524 computes and assigns a confidence score to each relation triple (candidate fact) in each relation cluster, and then selects a subset of the relation triples that satisfy a confidence-related threshold value. The confidence score information generally reflects a system-related degree of confidence associated with a relation triple, together with a measure of the prevalence of the relation triple within the collection of information items. The confidence score information helps discriminate between truthful and untruthful (and logically inconsistent) facts. It further helps to distinguish between relevant and irrelevant facts, where relevant facts are of potential interest to many people, and irrelevant facts are not. For instance, a fact that reads "Al Gore founded Facebook" is not truthful, and would be rejected. A statement that some individual, unknown to the general public, purchased a particular software product might be truthful, but is an unremarkable everyday occurrence, and therefore irrelevant, and would likewise be rejected.

Overall, the technique provides a way of sifting through unstructured information to find facts, and then further filtering the facts to find relevant facts. The technique does so even though the unstructured information, in its raw state, provides no telltale markers to identify entities and facts pertaining to those entities. Nor does it contain any clear indication of what information constitutes facts that may be interesting to a general audience.

A.2. Corpus-Providing Subsystem

Figure 6:
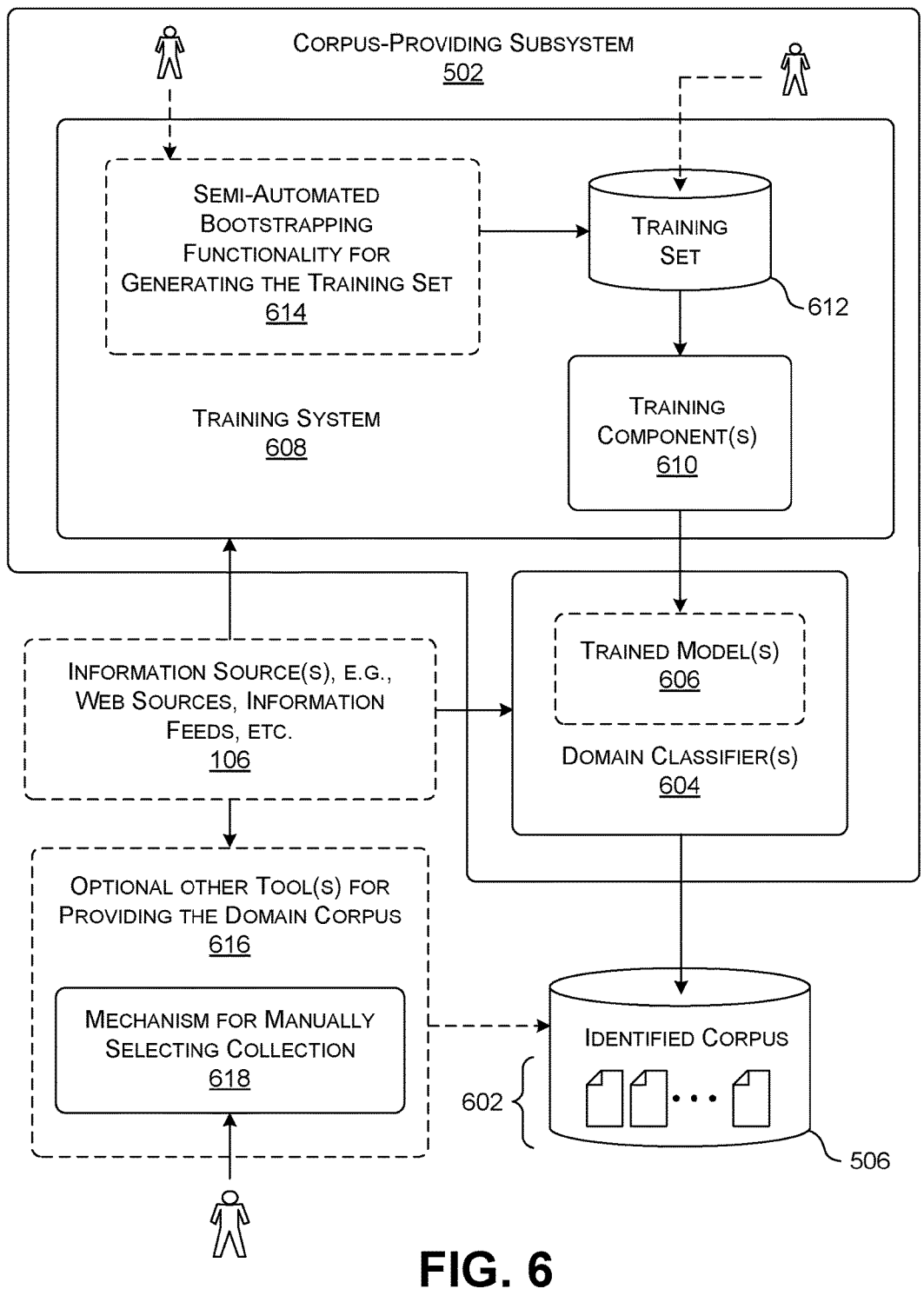
FIG. 6 shows one implementation of a corpus-providing subsystem, which is a part of the fact-extracting system of FIG. 5.

FIG. 6 shows one implementation of the corpus-providing building subsystem 502. The corpus-providing subsystem 502 provides (e.g., creates or receives) a collection of information items 602, constituting an identified corpus, and stores the identified corpus in the data store 506.

In one implementation, the corpus-providing subsystem 502 uses at least one domain classifier 604 to select information items pertaining to a particular subject matter domain, from among a larger collection of documents provided by one or more information sources 106. In one such case, the domain classifier 604 can use a machine-trained model 606, such as a logistic regression type model, a support vector machine type model, a neural network type model (e.g., a deep learning type model), and so on.

A training system 608 produces the model 606 using a training component 610. The training component 610 operates by iteratively generating a set of weighting values that define the model 606 based on a set of labeled training examples provided in a data store 612, e.g., by using gradient descent or any other training technique. Each training example represents an information item (e.g., a document), a label that describes the domain associated with the information item, and a set of feature values which describe the characteristics of the information item (and other contextual factors associated with the information item). In one implementation, a human developer can manually supply the labeled examples. In another implementation, semi-automated bootstrapping functionality 614 automatically generates the training examples after receiving a few seed examples from a human. One illustrative manifestation of the bootstrapping functionality 614 is described below with reference to FIG. 7.

In another implementation, some other tool 616 (besides the domain classifier 604) provides the collection of information items 602. One such tool corresponds to a user interface mechanism 618 that allows a user to select one or more information feeds and/or previously prepared collections of information. For instance, the user interface mechanism 618 can include a graphical control element that allows a user to pick one or more information feeds and/or previously prepared collections from a larger list of information feeds and/or collections. Or the graphical control element can allow a user to specify the information feed(s) and/or collections in text form, etc.

Figure 7:
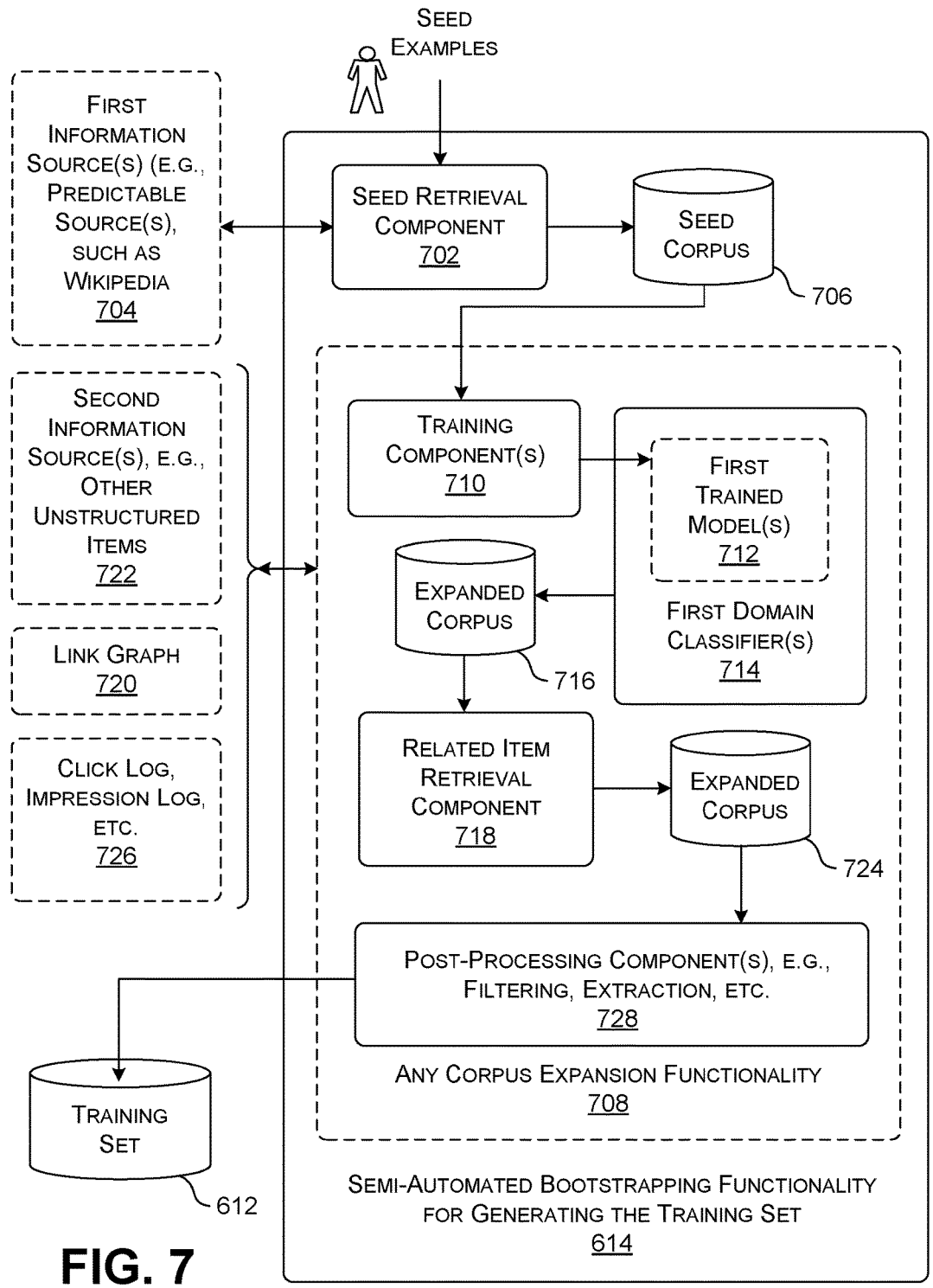
FIG. 7 shows more illustrative detail regarding one implementation of the functionality shown in FIG. 6.

FIG. 7 shows one implementation of the semi-automated bootstrapping functionality 614 for producing training examples pertaining to a particular domain (e.g., the software-related domain). The bootstrapping functionality 614 includes a seed retrieval component 702 for retrieving an initial collection of information items from a first information source 704. The seed retrieval component 702 stores the initial collection of information items, constituting a seed corpus, in a data store 706. As noted above, this explanation repeatedly makes reference to storing information items. This operation can constitute storing actual information items (e.g., documents), but it can alternatively represent storing references (e.g., URLs) that point to the information items and enable later retrieval of the information items.

In one manner of operation, a human developer manually supplies a relatively small set of argument values, corresponding to examples of entities, that pertain to the particular domain being targeted. For instance, the developer can manually provide a few dozen such values. For example, for a software-related domain, the human developer can provide argument values such as "Steve Jobs," "Bill Gates," "Apple Inc.," "Microsoft Corporation," "Windows 10," and so on, generally corresponding to entity classes such as people, places, companies, products, events, etc. pertaining to the software domain.

The seed retrieval component 702 can then submit each argument value in the seed corpus to a search engine, such as the BING search engine provided by MICROSOFT CORPORATION, of Redmond, Wash. In response, the search engine provides a ranked list of information items (e.g., web page hits) that match each argument value, selected from the first information source 704. The seed retrieval component 702 accepts the n top ranked information items for each entity example, to collectively provide the seed corpus.

In one implementation, the first information source 704 represents a high-quality and controlled corpus of information items, such as the Wikipedia online encyclopedia. The semi-automated bootstrapping functionality 614 can be assured of obtaining a high-quality seed corpus by pulling information from the Wikipedia online encyclopedia, compared to performing an Internet-wide search. But in another implementation, the seed retrieval component 702 can alternatively, or in addition, generate the seed corpus by performing a general web search.

Expansion functionality 708 can then expand the information items in the seed corpus through one or more corpus-expansion operations. Without limitation, the expansion functionality 708 can expand the seed corpus using the following sequence of operations.

Operation 1. A training component 710 can produce a first trained model 712 using any machine-learning technique, examples of which were cited above. A domain classifier 714 can then use the trained model 712 to process each of the information items in the first information source 704 (e.g., corresponding to the Wikipedia online encyclopedia), and to select a subset of those information items that have a high likelihood of belonging to the domain under consideration. The domain classifier 714 stores the identified additional documents in a data store 716. The data store 716 provides a first version of an expanded corpus.

Operation 2. For each target information item in the expanded corpus under consideration (in data store 716), a related item retrieval component 718 uses a link graph 720 to find zero, one, or more other information items that link to the target information item. In other words, the related item retrieval component 718 uses the link graph 720 to determine the source information item(s) (if any) which contain hyperlinks which point to the target information item. The related item retrieval component 718 can then retrieve those source information items from a second information source 722 and store those information items (or URLs associated with those information items) in a data store 724. The second information source 722 may collectively represent the information resources provided by the World Wide Web.

Alternatively, or in addition, the related item retrieval component 718 can use a click log and/or an impression log 726 to identify related information items. In that case, the related item retrieval component 718 treats two information items as related when many users clicked on both information items in response to performing a search (corresponding to co-clicks, as revealed by the click log) and/or when a search engine commonly presents both information items in the same list of search results (as conveyed by the impression log). At the close of its operations, the related item retrieval component 718 produces a second version of an expanded corpus in the data store 724.

Operation 3. One or more post-processing components 728 can filter out a subset of information items in the expanded corpus (in the data store 724) produced by the related item retrieval component 718. For example, the post-processing components 728 can filter out documents below a prescribed size, documents not in a target language (e.g., English), etc. The post-processing components 728 can then extract the contents of each remaining information item in the expanded corpus.

The corpus expansion functionality 708 yields a final version of an expanded corpus, which also constitutes the training set provided in the data store 612. Referring back to FIG. 6, the training component 610 can use the training set to produce the final trained model 606. The training component 610 can use a feature set in its training operation that differs from the feature set used to produce the first trained model 712, e.g., to take account for the fact that the information items in the expanded corpus now contain general content obtained from the World Wide Web.

Although not shown in FIG. 6, the corpus-providing subsystem 502 can also use the link graph 720 (and/or the click log and/or the impression log 726) to enhance the identified corpus in the data store 506. For example, the corpus-providing subsystem 502 can find source information items that contain hyperlinks that link to target information items in the identified corpus. The corpus-providing subsystem 502 can then add those source information items to the identified corpus.

Note that the bootstrapping functionality 614 is optional. In another example, the corpus-providing subsystem 502 can use a commercially-produced domain classifier. That domain classifier can then be used to generate the identified corpus by selecting a collection of in-domain information items from a larger body of information items.

Overall, note that a human developer can produce the identified corpus with a relatively small amount of effort, e.g., limited to submitting the seed examples to the seed retrieval component 702. Hence, a human developer can quickly produce corpora for different target domains using the same system. In yet other cases, the developer can dispense with even the seed example submission operation by using a commercial domain classifier, or by choosing one or more information feeds, or by choosing one or more previously compiled collections of information items.

A.3. Entity-Recognizing Subsystem

Figure 8:
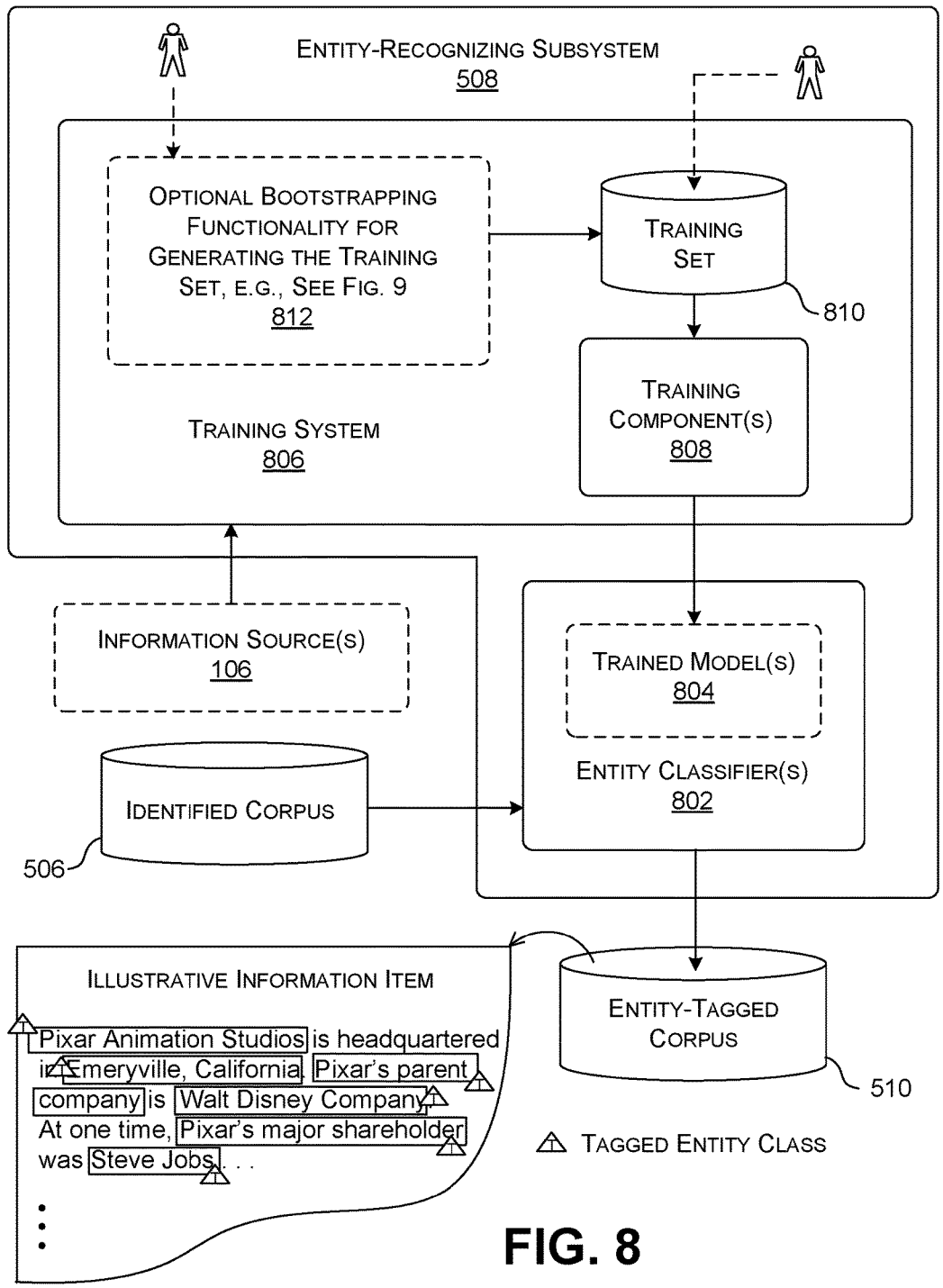
FIG. 8 shows one implementation of an entity-recognizing subsystem, which is another part of the fact-extracting system of FIG. 5.

FIG. 8 shows one implementation of the entity-recognizing subsystem 508. The entity-recognizing subsystem 508 identifies the occurrence of named entities in the identified corpus (produced by the corpus-providing subsystem 502), or in any other text. The entity-recognizing subsystem 508 also labels the type of each named entity that it finds, e.g., by labeling a person's name in an information item as a person-type named entity. The entity-recognizing subsystem 508 produces an entity-tagged corpus which it stores in the data store 510.

In one implementation, the entity-recognizing subsystem 508 uses at least one entity classifier 802 to identify and classify named entities. In one such case, the entity classifier 802 can use a machine-trained model 804 that operates as a sequence labeler, such as conditional random fields (CRF) model. A CRF model provides the most probable slot sequence defined by:

$$\hat{Y} = \operatorname*{argmax}_{Y} p(Y \mid X).$$

In this equation, the term X refers to a sequence of tokens in a sentence $(x_1, x_2, \ldots, x_T)$ and Y refers to a sequence of tags $(y_1, y_2, \ldots, y_T)$ assigned to the tokens, where the tags are selected from a set C of possible tags. In the present case, the tags correspond to entity name types, e.g., <person>, <organization>, <date>, <product>, etc.

A training system 806 produces the model 804 using a training component 808. The training component 808 operates by iteratively generating a set of weighting values that define the model 804 based on a set of labeled training examples provided in a data store 810. Each training example represents a sentence that contains zero, one or more labeled named entities. Each training example also provides a set of feature values that describe the characteristics of the information item (and other contextual factors associated with the information item). In one implementation that is supervised in nature, a human developer can manually provide the labeled examples. In another implementation that is semi- or weakly-supervised in nature, bootstrapping functionality 812 automatically generates the training examples.

Figure 9:
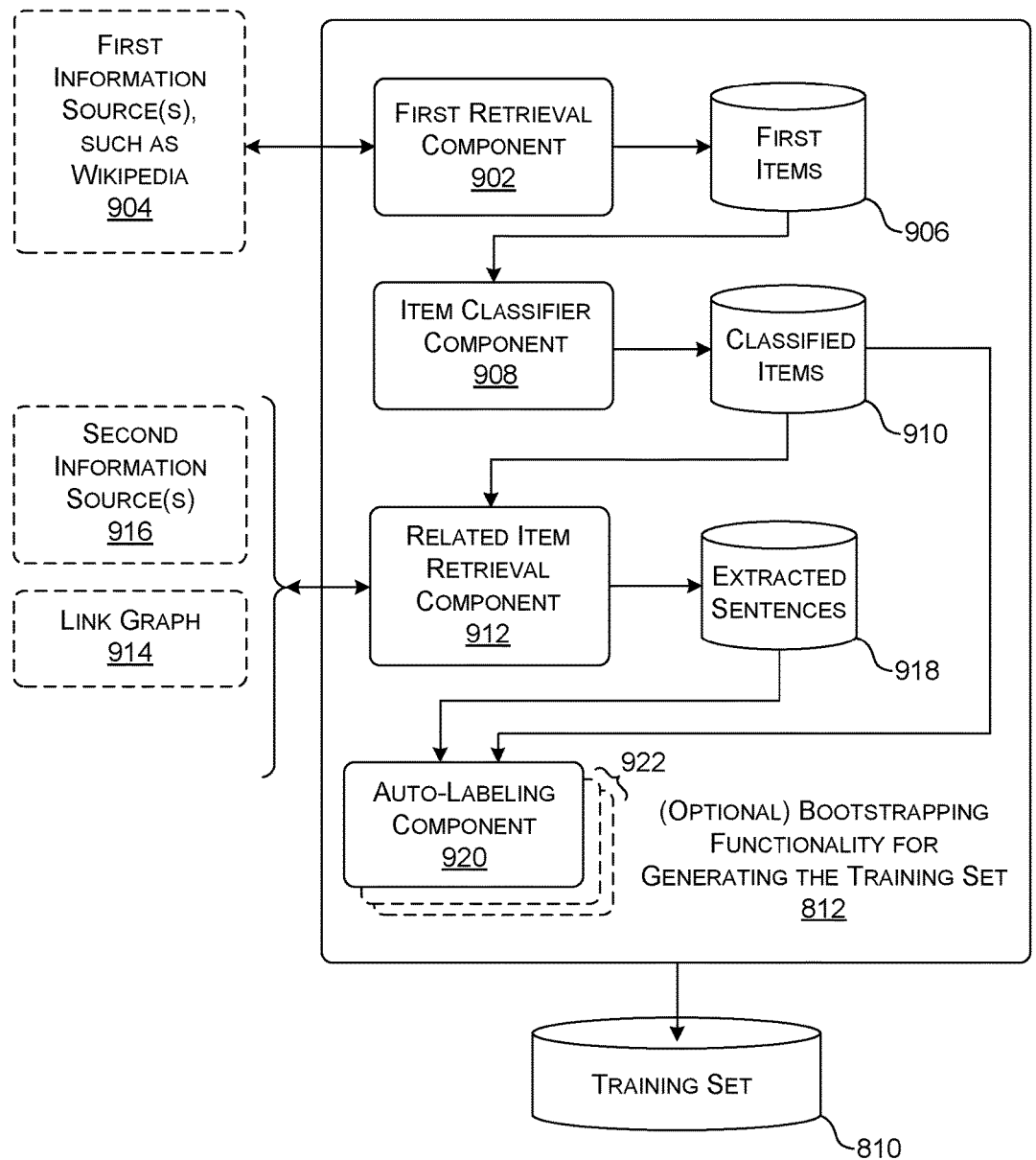
FIG. 9 shows more illustrative detail regarding one implementation of the functionality shown in FIG. 8.

FIG. 9 shows one implementation of the bootstrapping functionality 812 for producing training examples used to produce the trained model 804. A first retrieval component 902 extracts a first set of information items from a first information source 904 based on any selection criteria, and then stores the first set of information items in a data store 906. For example, the first information source 904 may correspond to the Wikipedia online encyclopedia, and the first items may correspond to a set of Wikipedia pages that satisfy some specified search criteria.

An item classifier component 908 classifies the main topic of each information item in the first set of information items. For example, the item classifier component 908 classifies a page regarding the boxer Muhammad Ali to indicate that the page pertains to a person. The item classifier component 908 classifies a page regarding Paris to indicate that the page pertains to a location, and so on. In one approach, the item classifier component 908 can perform its classification operation using a machine-trained model, and/or by leveraging classification information provided by the page itself. As a result of its operation, the item classifier component 908 produces a set of classified information items in a data store 910.

A related item retrieval component 912 uses a link graph 914 to find related information items that link to the classified information items in the data store 910. For instance, for each target classified information item in the data store 910, the related item retrieval component 912 uses the link graph 914 to identify one or more related source information items that contain at least one hyperlink which links to the target classified information item. The related item retrieval component 912 can then interact with second information sources 916 to retrieve the related information items. The second information sources 916 may correspond to the same source(s) or different source(s) compared to the first information sources 904. For instance, the second information sources 916 may correspond to the Wikipedia online encyclopedia or, more generally, may correspond to the information resources provided by the World Wide Web.

The related item retrieval component 912 then extracts the sentences in the related information items that link to the classified information items in the data store 910. For example, the related item retrieval component 912 can extract the following hypothetical sentence from a source information item: "The boxer Muhammad Ali passed away in 2016, after suffering many years from Parkinson's disease." In this sentence, the text "Muhammad Ali" is linked to one of the classified information items in the data store 910. The related item retrieval component 912 can store the extracted sentences in a data store 918.

An auto-labelling component 920 automatically adds classification labels to the extracted sentences. For example, in the above example, the auto-labelling component 920 labels the text "Muhammad Ali" as a person name because it links to an information item that has been classified as describing a person.

Other auto-labeling components 922 can use other strategies for automatically labeling sentences. For example, assume that a sentence contains the text "Muhammad Ali" but that text is not explicitly linked to a classified document describing Muhammad Ali. Nevertheless, another auto-labeling component can label the text "Muhammad Ali" as describing a person because many classified information items contain the text "Muhammad Ali" in their respective titles.

Note that the bootstrapping functionality 812 is optional. In another example, the entity-recognizing subsystem 508 can use a commercially-produced named entity recognizer of any type to transform the identified corpus into the entity-tagged corpus.

A.4. Relation-Extracting Subsystem

Figure 10:
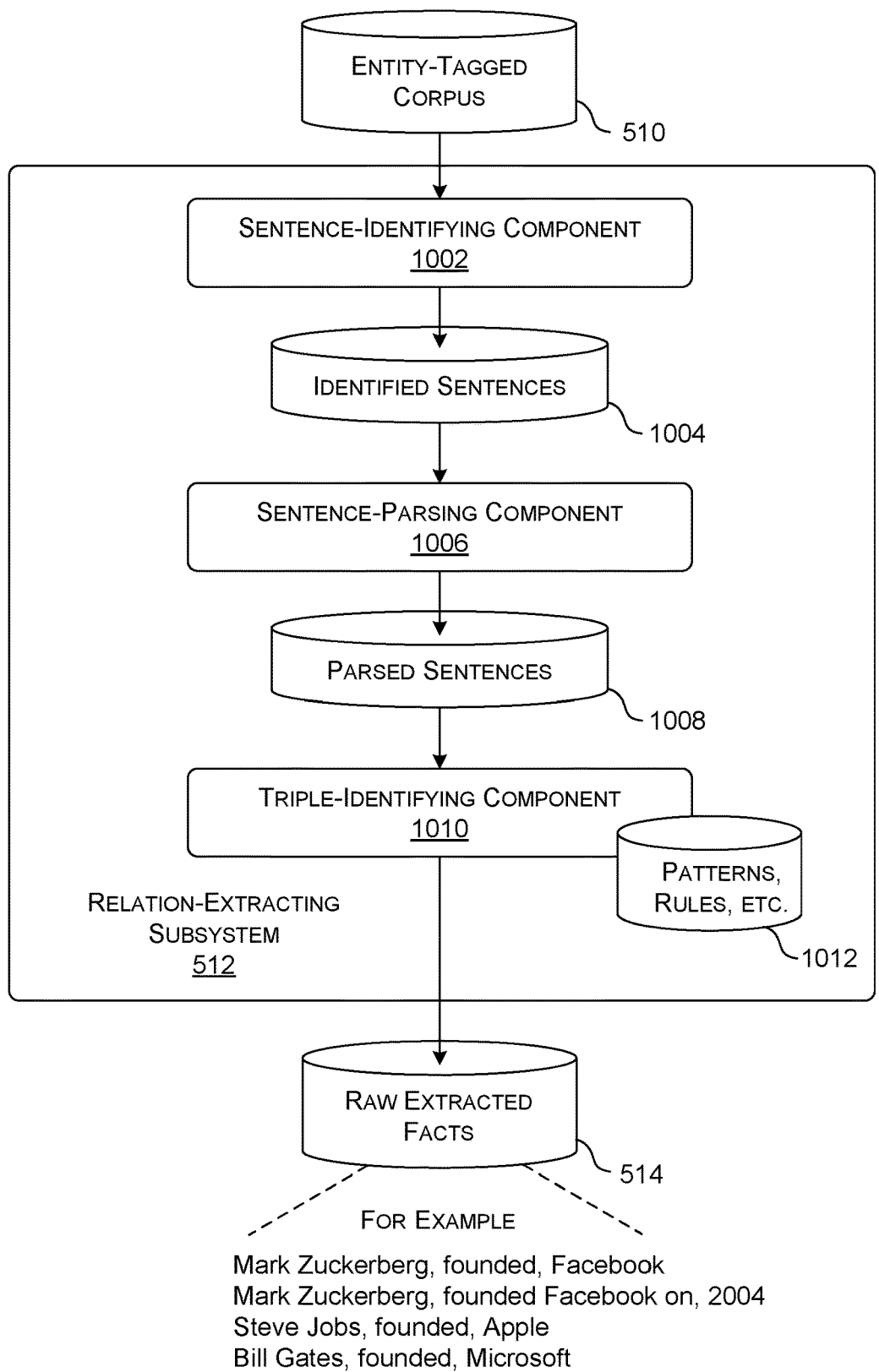
FIG. 10 shows one implementation of a relation-extracting subsystem, which is another part of the fact-extracting system of FIG. 5.

FIG. 10 shows one implementation of the relation-extracting subsystem 512. The relation-extraction subsystem 512 extracts relation triples from the entity tagged corpus. Each relation triples includes a first argument value (entity1), corresponding to a named entity that serves as a subject, a second argument value (entity2), corresponding to a named entity that serves as an object, and a relation value which expresses a relationship between the first argument value and the second argument value. Each relation triple constitutes a candidate fact, also referred to as a raw extracted fact. A data store 514 stores the set of raw extracted facts.

A sentence-identifying component 1002 identifies a set of sentences in the entity tagged corpus, each of which contains at least two tagged named entities. It stores such identified sentences in a data store 1004.

A sentence-parsing component 1006 uses any parsing technique to parse the identified sentences, to produce a collection of parsed sentences. For example, the sentence-parsing component 1006 can use a hidden Markov model, a conditional random fields model, or any other statistical parsing technique to perform the parsing. Some such techniques can generate a set of candidate parse trees for each identified sentence, each having probability score information associated therewith. The sentence-parsing component 1006 selects the parse tree having the highest probability score information. The selected parse tree can represent the parts of a sentence as a hierarchical constituency parse tree, with each leaf node of the tree associated with a label that identifies its part of speech, e.g., using the Penn Treebank Project part-of-speech tags. The sentence-parsing component 1006 stores the parsed sentences in a data store 1008.

A triple-identifying component 1010 identifies zero, one or more relation triples in each parsed sentence. To do so, the triple-identifying component 1010 can rely one set of patterns and/or rules specified in a data store 1012. For example, the triple-identifying component 1010 can consult a set of regular expression (RegEx) patterns or the like which describe the acceptable forms that a relation value can assume within a parsed sentence. In one form, a qualifying relation value can correspond to V or VP or VW*P, where V corresponds to a verb particle, W corresponds to a noun or adjective or adverb or pronoun or determiner, and P correspond to preposition or particle or infinitive marker. The triple-identifying component 1010 can then consult one or more rules that describe how to locate the subject and object relative to the identified relation value.

Figure 11:
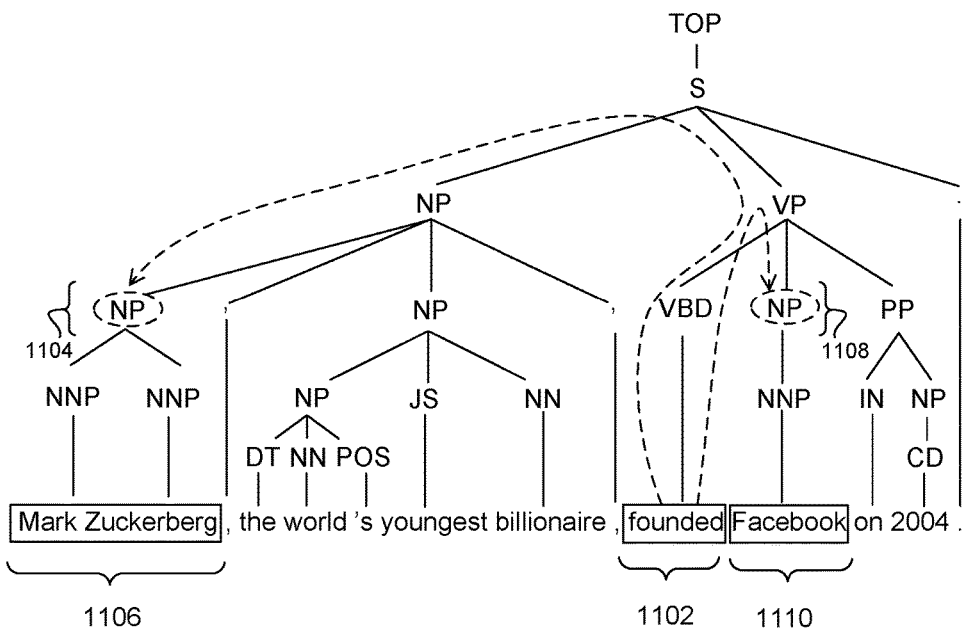
FIGS. 11 and 12 show how the relation-extracting subsystem (of FIG. 10) can extract two candidate facts (relation triples) from a particular parsed sentence.
Figure 12:
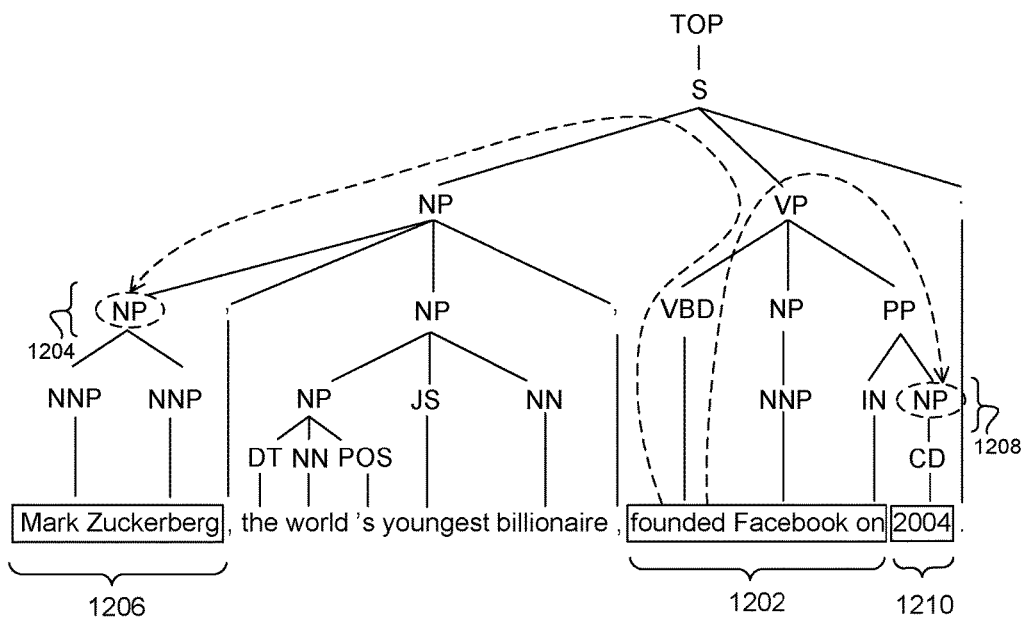

FIGS. 11 and 12 demonstrate how the triple-identifying component 1010 can identify relation triples within an illustrative parsed sentence. The sentence reads, "Mark Zuckerberg, the world's youngest billionaire, founded Facebook in 2014."

With respect to FIG. 11, the triple-identifying component 1010 first identifies a qualifying relation value 1102, corresponding to the verb "founded," that matches one of the regular expressions in the data store 1012. The triple-identifying component 1010 then looks for a nearest noun phrase head 1104 to the left of the relation value 1102, corresponding to the named entity 1106, "Mark Zuckerberg." It identifies this named entity 1106 as the subject of the parsed sentence. In general, a noun phrase head corresponds to a main noun in a noun phrase. For example, the noun phrase head of "long street" is "street" because "street" is the main noun and "long" is an adjective describing it.

The triple-identifying component 1010 then looks for a nearest noun phrase head 1108 to the right of the relation value 1102, corresponding to the named entity 1110, "Facebook." It identifies this named entity 1108 as the object of the parsed sentence. In general, the triple-identifying component 1010 finds a "nearest" noun phrase head by selecting the noun phrase head having the fewest number of node hops from the relation value 1102 within the hierarchical parse tree.

In FIG. 12, the triple-identifying component 1010 identifies another qualifying relation value 1202, corresponding to the verb phrase "founded Facebook on" that matches another regular expression in the data store 1012. The triple-identifying component 1010 then uses the same search rules described above to find a noun phrase head 1204 to the left of the relation value 1202, corresponding to the named entity 1206, "Mark Zuckerberg." It then finds a noun phrase head 1208 to the right of the relation value 1202, corresponding to the named entity 1210, "2004."

In the present case, the triple-identifying component 1010 determines that the single parsed sentence contains at least two relation triples, constituting separate but related candidate (raw) facts. In some implementations, the relation-extracting subsystem 512 can also optionally link the facts together. For example, the triple-identifying component 1010 can register the date "2004" as an attribute of the relation triple <"Mark Zuckerberg," "founded," "Facebook">.

A.5. Argument-Merging Subsystem

Figure 13:
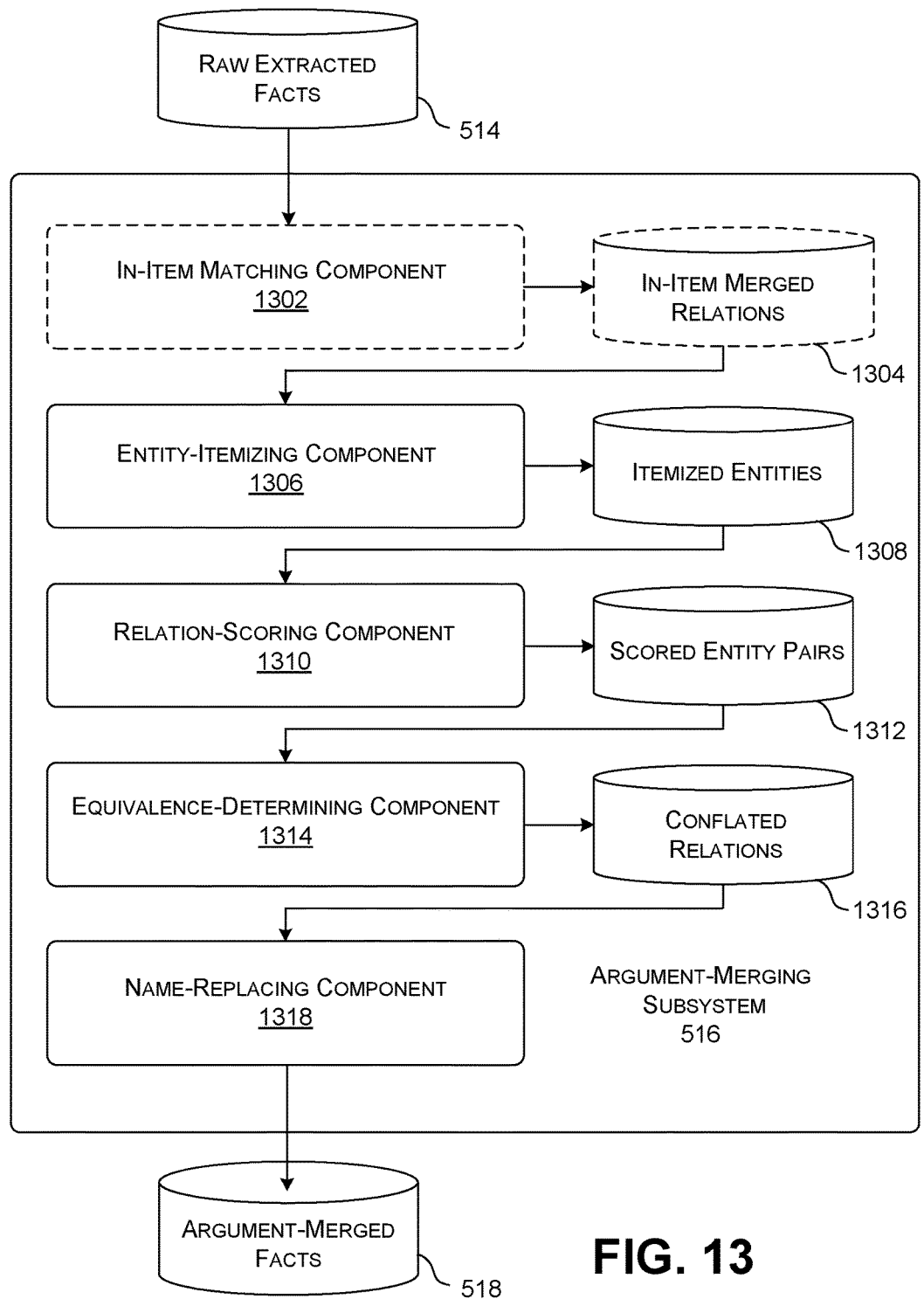
FIG. 13 shows one implementation of an argument-merging subsystem, which is another part of the fact-extracting system of FIG. 5.

FIG. 13 shows one implementation of the argument-merging subsystem 516. The argument-merging subsystem 516 conflates argument values within the raw extracted facts that are considered synonymous, e.g., by identifying that "Bill Gates" and "William Gates" refer to the same person, and then collapsing these different expressions into a single canonical argument value, such as "Bill Gates."

An in-item matching component 1302 first identifies those cases in which a single information item (e.g., a single document) from which one or more relation triples have been extracted contains multiple versions of an argument value, where one or more versions of that argument value appear in the extracted relation triple(s). For example, assume that a relation triple under consideration contains the argument value "Gates" (without an immediately preceding "Bill"). Further assume that the relation triple originates from an information item that also uses the terms "Bill Gates" and "Bill" (without an immediately following "Gates"). In response to this finding, the in-item matching component 1302 considers "Gates" and "Bill" as equivalent to "Bill Gates" because "Gates" and "Bill" each represents a subset of the tokens in "Bill Gates." The in-item matching component 1302 then replaces each occurrence of "Gates" and "Bill" within the information item with the longest identified version of the argument value, namely "Bill Gates." Overall, the in-item matching component 1302 stores a set of in-item merged relations in a data store 1304 that reflect the outcome of the above-described in-item conflating operation.

An entity-itemizing component 1306 identifies the m unique argument values in the in-item merged relations, and the relation triple information associated therewith. For example, the entity-itemizing component 1306 can indicate that the set of in-item merged relations contain the argument value "Bill Gates"; it can then enumerate how the argument value "Bill Gates" is related to other argument values within the set of in-item merged relations. One relationship corresponds to "lives in Seattle." Another relationship corresponds to "founded Microsoft," and so on. Overall, the entity-itemizing component 1306 produces a data structure that contains a set of itemized entities, provided in data store 1308.

A relation-scoring component 1310 enumerates all the possible pairs of unique argument values within the itemized entities, e.g., <entity1 value, entity2 value>. For example, if the itemized entities include values A, B, C, and D, the possible pairs correspond to <A,B>, <A,C>, <A,D>, <B,C>, <B,D>, and <C,D>. It then generates pair score information for each pair of argument values. For example, one such pair may correspond to "Bill Gates" and "BG." The pair score information quantifies an extent to which the argument values of the pair can be considered synonymous.

The pair score information reflects a final conclusion that is based on multiple dimensions of similarity. A first similarity measure reflects the degree to which relation triple information for the first member (entity1 value) of the pair overlaps with relation triple information for the second member (entity2 value) of the pair. For example, the relation-scoring component 1310 may find that the itemized relationships contains 1000 occurrences of the relation triple "Bill Gates founded Microsoft" and 700 occurrences of the relation triple "BG founded Microsoft." The relation-scoring component 1310 can therefore conclude that "Bill Gates" overlaps with "BG" at least 700 times. More formally stated, the relation-scoring component 1310 can count the number of times that any pairing <relation value, entity2 value> appears in both the relation triple information associated with "Bill Gates" and the relation triple information associated with "BG"; in the specific example cited here, the paring <relation value, entity2 value> is <founded, Microsoft>, but, more generally, it could represent any pairing.

A second similarity measure reflects an extent to which the first argument value in a pair is lexically related to the second argument value in a pair. For instance, the second measure reflects an extent to which "Bill Gates" is lexically similar to "BG." The relation-scoring component 1310 can assess lexical similarity in any manner, such as by computing an edit distance between the two argument values under consideration.

A third measure depends on the frequency at which each argument value in the pair occurs within the collection of items. For example, the relation-scoring component 1310 can determine the number of times that "Bill Gates" occurs, and the number of times that "BG" occurs. The relation-scoring component 1310 can then form a ratio of these two counts. The third measure is based on the premise that two argument values that refer to the same named entities often occur with similar frequencies within a corpus, yielding a ratio close to 1.0.

The relation-scoring component 1310 can compute the final pair score information for each pair by forming a weighted sum based on the above-described three measures. Or the relation-scoring component 1310 can compute the final pair score information using a machine-trained model. Overall, the relation-scoring component 1310 generates a set of scored entity pairs for storage in a data store 1312. That is, the set of scored entity pairs enumerates each pairing of entity values in the itemized entities and provides the pair score information associated therewith.

An equivalence-determining component 1314 uses the pair score information to identify clusters of synonymous entity values. For example, based on the pair score information, the equivalence-determining component 1314 can determine that an argument value a1 is sufficiently similar to an argument value a2. The equivalence-determining component 1314 can reach this conclusion with respect to any environment-specific threshold value. In response, the equivalence-determining component 1314 can conclude that argument values a1 and a2 refer to the same named entity. The equivalence-determining component 1314 outputs its results as a set of conflated relations, which it stores in a data store 1316.

A name-replacing component 1318 replaces each group of argument values deemed equivalent with a canonical argument value. For example, the canonical argument value can correspond to the longest argument value among the group. For instance, the name-replacing component 1318 can replace every occurrence of "BG" in the raw extracted facts with "Bill Gates" because "Bill Gates" is longer than "BG." In addition, or alternatively, the name-replacing component 1318 can select the argument value that occurs most frequently within a corpus as the canonical argument value. For example, the name-replacing component can choose "Bill Gates" over "BG" because it is most popular among document authors. The name-replacing component 1318 can generally use different selection factors in choosing a canonical argument value depending on the entity type under consideration. For instance, the name-replacing component 1318 can use the string length metric for people's names, and the popular metric for company names, etc.

Figure 14:
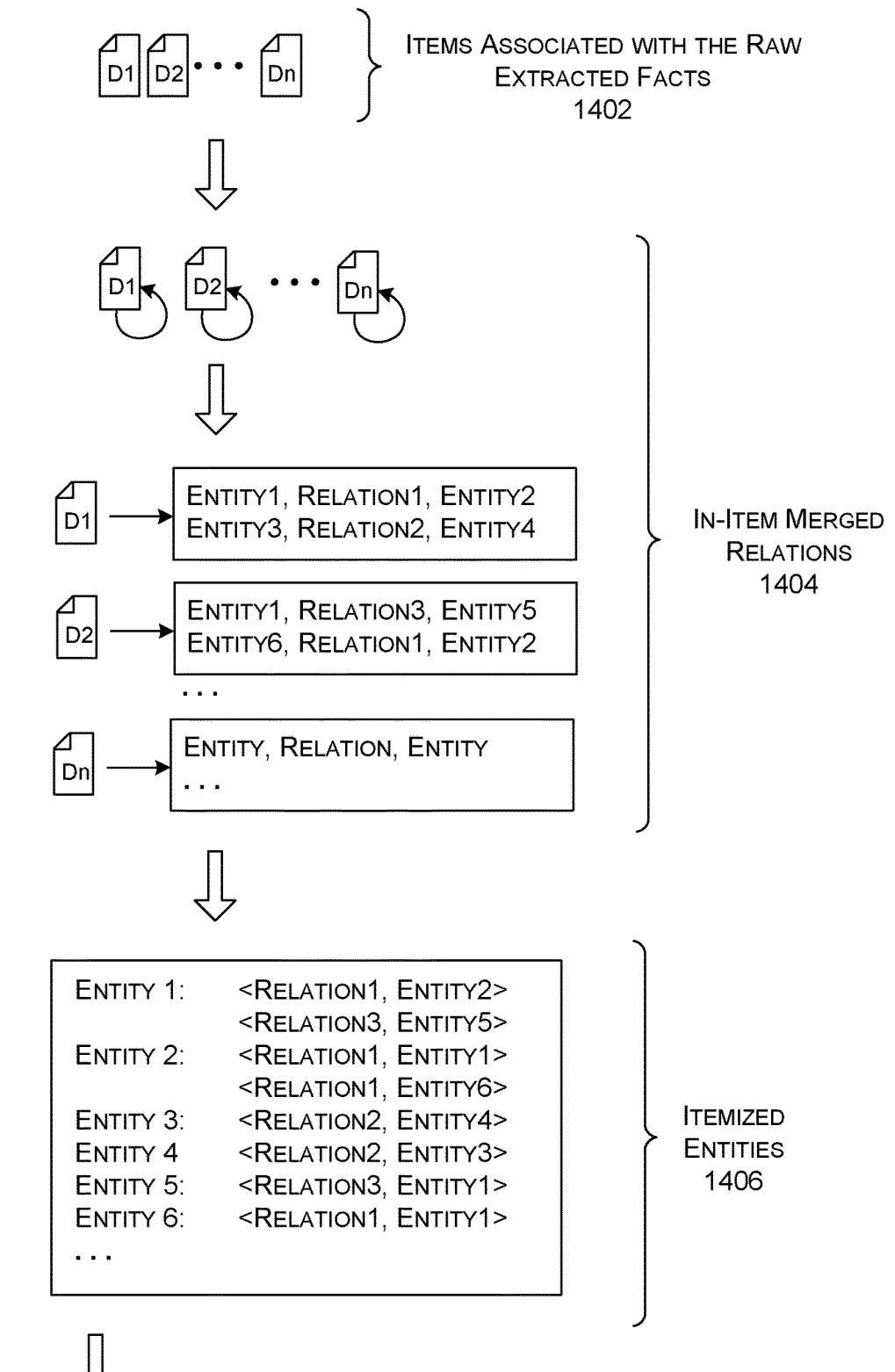
FIGS. 14 and 15 show information that represents the output of the argument-merging subsystem (of FIG. 13) at different respective stages of its operation.
Figure 15:
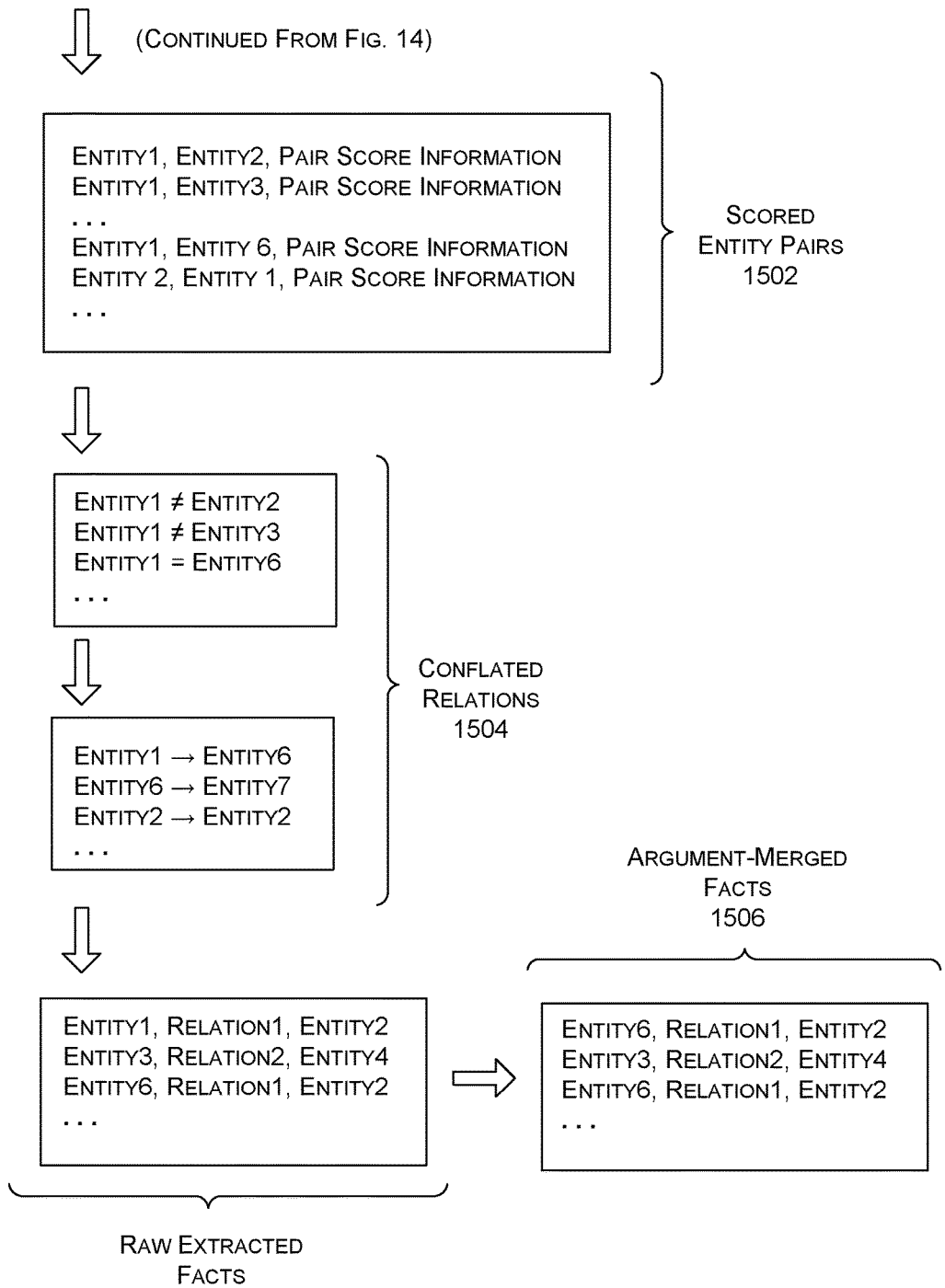

FIGS. 14 and 15 depict an example of the sequence of operations described above. Assume that the raw extracted facts contain relation triples extracted from a set of information items 1402. First, the in-item matching component 1302 uses in-item processing to produce the in-item merged relations 1404. Next, the entity-itemizing component 1306 enumerates the unique argument values in the in-item merged relations 1404, and the relation triple information associated therewith, to produce a set of itemized entities 1406.

Advancing to FIG. 15, the relation-scoring component 1310 next enumerates possible pairs of argument values in the itemized entities, and generates an instance of pair score information for each such pair. This produces a set of scored entity pairs 1502. Next, the equivalence-determining component 1314 identifies equivalent argument values based on the pair score information, to produce conflated relations 1504. Finally, the name-replacing component 1318 replaces each group of equivalent argument values with a single canonical value. In this specific example, the equivalence-determining component 1314 determines that entity 1 refers to the same named entity as entity6; as such, the name-replacing component 1318 replaces occurrences of entity1 with entity6, to yield a set of argument-merged facts 1506.

A.6. Relation-Clustering Subsystem

Figure 16:
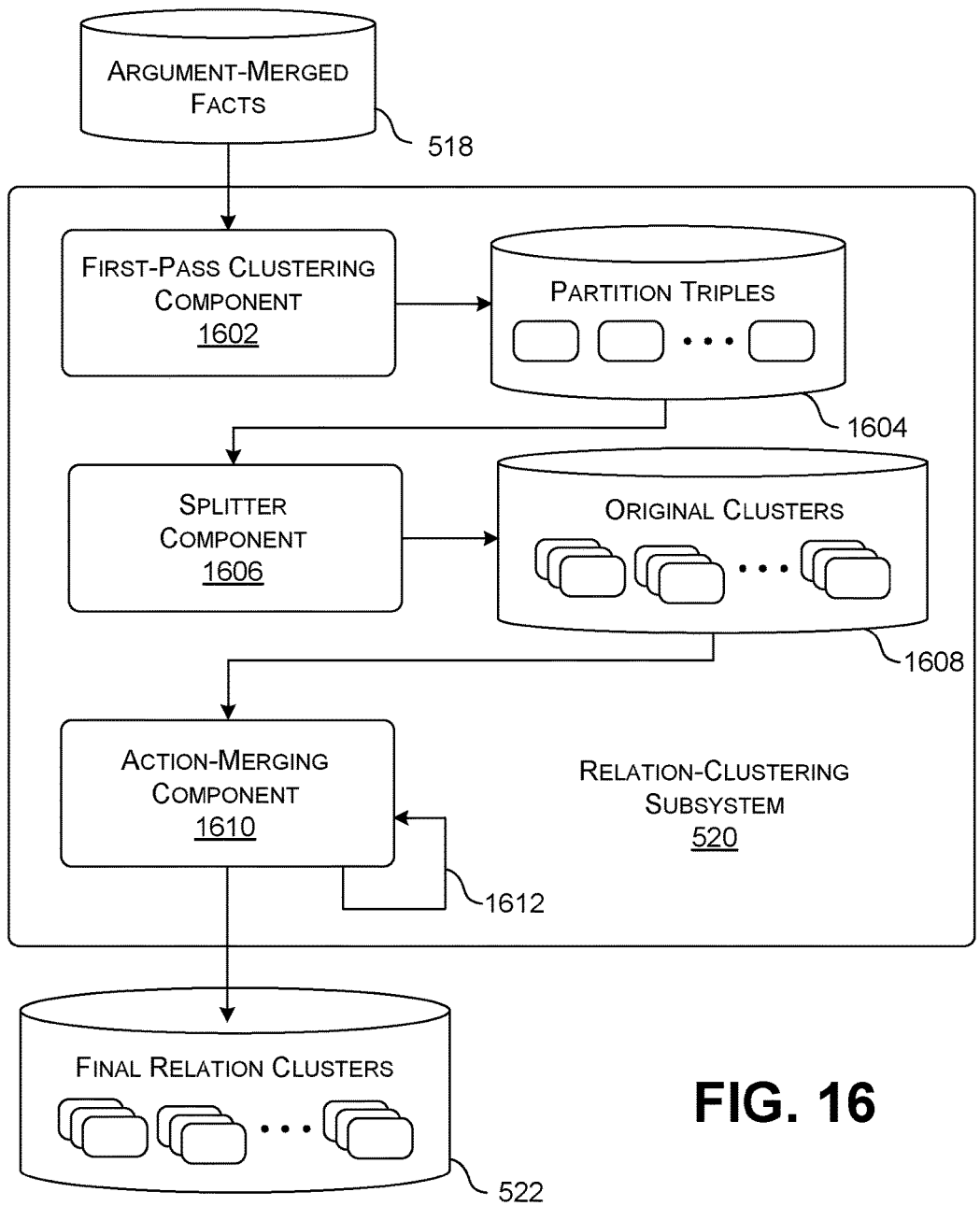
FIG. 16 shows one implementation of a relation-clustering subsystem, which is another component of the fact-extracting system of FIG. 5.

FIG. 16 shows one implementation of the relation-clustering subsystem 520. The relation-clustering subsystem 520 organizes the relation triples in the argument-merged facts into relation clusters. Each relation cluster identifies a particular first type of argument value, a particular relation value, and a particular second type of argument value.

A first-pass clustering component 1602 first organizes the relation triples in the argument-merged facts into multiple partitions, which it stores in a data store 1604. Each partition contains relation triples that pertain to a particular first type of argument value and a particular second type of argument value. For example, one partition can group together all relation triples that describe any type of relationship between any first company and any second company. Another partition can group together relation triples that describe any type of relationship between any person and any company, and so on.

A splitter component 1606 further breaks down each partition into one or more original clusters on the basis of the relation values specified in the partition. For example, with respect to the partition of <company, company>, the splitter component 1606 can identify a first original cluster that contains all relation triples in which some first company acquires some second company, the operative relation value here being "acquire." A second original cluster in the partition contains all relation triples in which some first company sues some second company, the operative relation value here being "sue," and so on. When performing this operation, the splitter component 1606 can take into consideration the head stem verb associated with each relation value. The splitter component 1606 stores the complete set of original clusters in a data store 1608.

An action-merging component 1610 operates by merging original clusters within a partition that pertain to the same action. In other words, the action-merging component 1610 merges original clusters within a partition that expresses synonymous relation values. For example, the action-merging component 1610 can merge a relation cluster for <any company1, purchased, any company2> with a relation cluster for <any company1, bought, any company2>, as the verbs "purchased" and "bought" are considered equivalent. As indicated by an iteration loop 1612, the action-merging component 1610 repeats such merging until it determines that no additional relation clusters can be combined. At this juncture, the action-merging component 1610 outputs a final set of relation clusters for storage in the data store 522.

The action-merging component 1610 can use different measures to determine whether two relation clusters <cluster1, cluster2 > should be merged. In one example, the action-merging component 1610 computes the intersection between the relation triples in the first relation cluster with the relation triples in the second relation cluster. The action-merging component 1610 determines that the two relation clusters should be merged when the intersection yields a score that exceeds an environment-specific threshold value. More specifically, again consider a first relation cluster associated with the relation value "purchased," and a second relation cluster associated with the relation value "bought." It may be the case that "purchased" and "bought" bind together many of the same pairs of argument values, e.g., as in "Facebook purchased Instagram," and "Facebook bought Instagram." Each such shared occurrence constitutes an instance of an intersection between two relation clusters.

As a side point, note that, in many cases, a combination of two or more relation triples conveys additional insight. For example, a relation cluster may convey a logical connection between two facts and associated events, as when a first relation triple states that "company A acquired product X from company B," and a second relation triple states that "company B acquired product X from company C." The relationship of these two facts implies a logical sequence of operations, in which company B acquired the product X and then sold it to company A.

Figure 17:
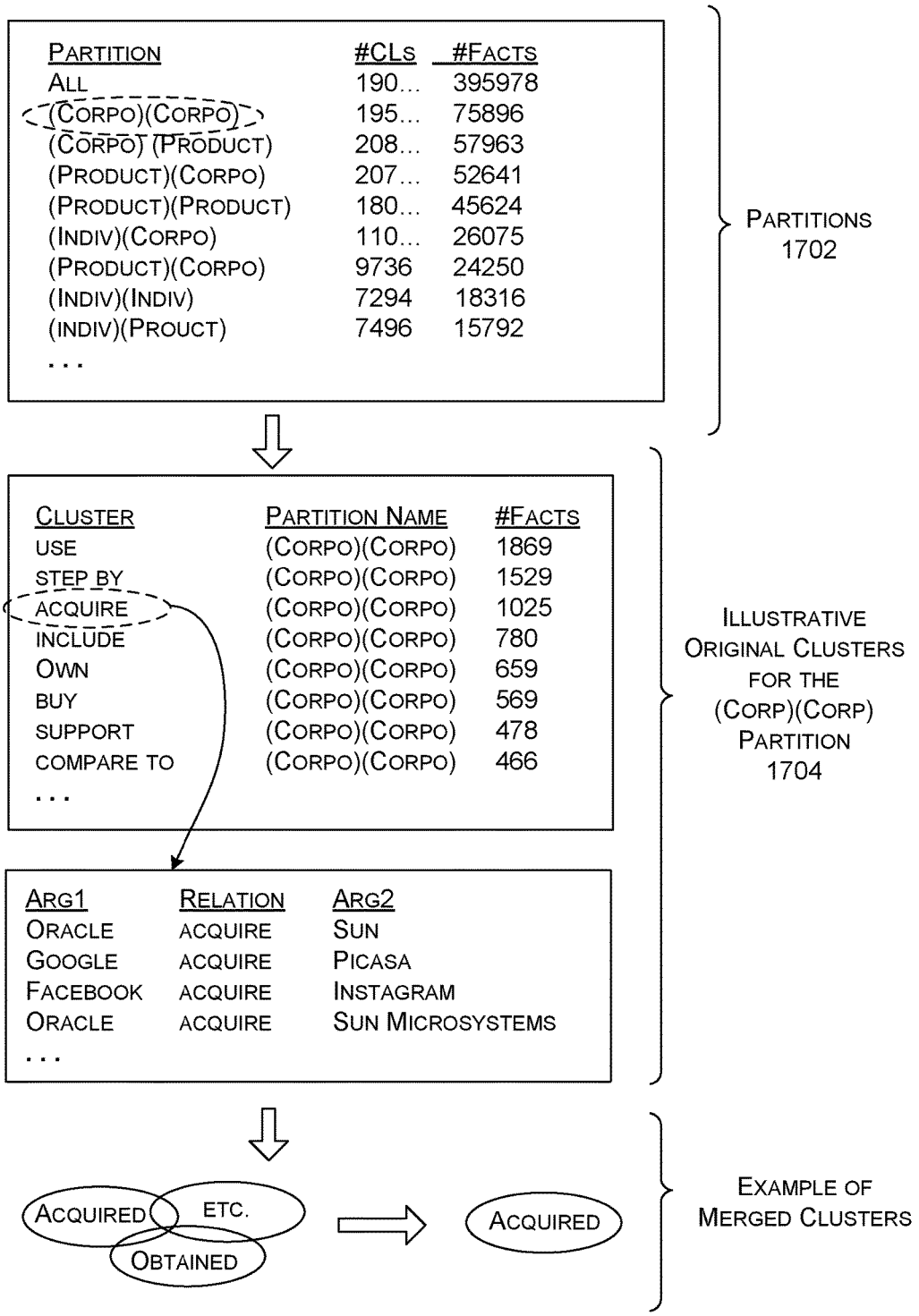
FIG. 17 shows information that represents the output of the relation-clustering subsystem (of FIG. 16).

FIG. 17 shows information that represents the output of the relation-clustering subsystem 520. The first-pass clustering component 1602 produces a set of partitions 1702.

One partition describes any relationship between any first argument value of type company and any second argument value of type company. The splitter component 1606 produces original clusters associated with each partition, such as the original clusters 1704 for the <corporation, corporation> partition. The action-merging component 1610 produces final relation clusters, e.g., by merging a relation cluster associated with the relation value "acquired" with a relation cluster associated with a relation value "obtained."

A.7. Confidence-Scoring Subsystem

Figure 18:
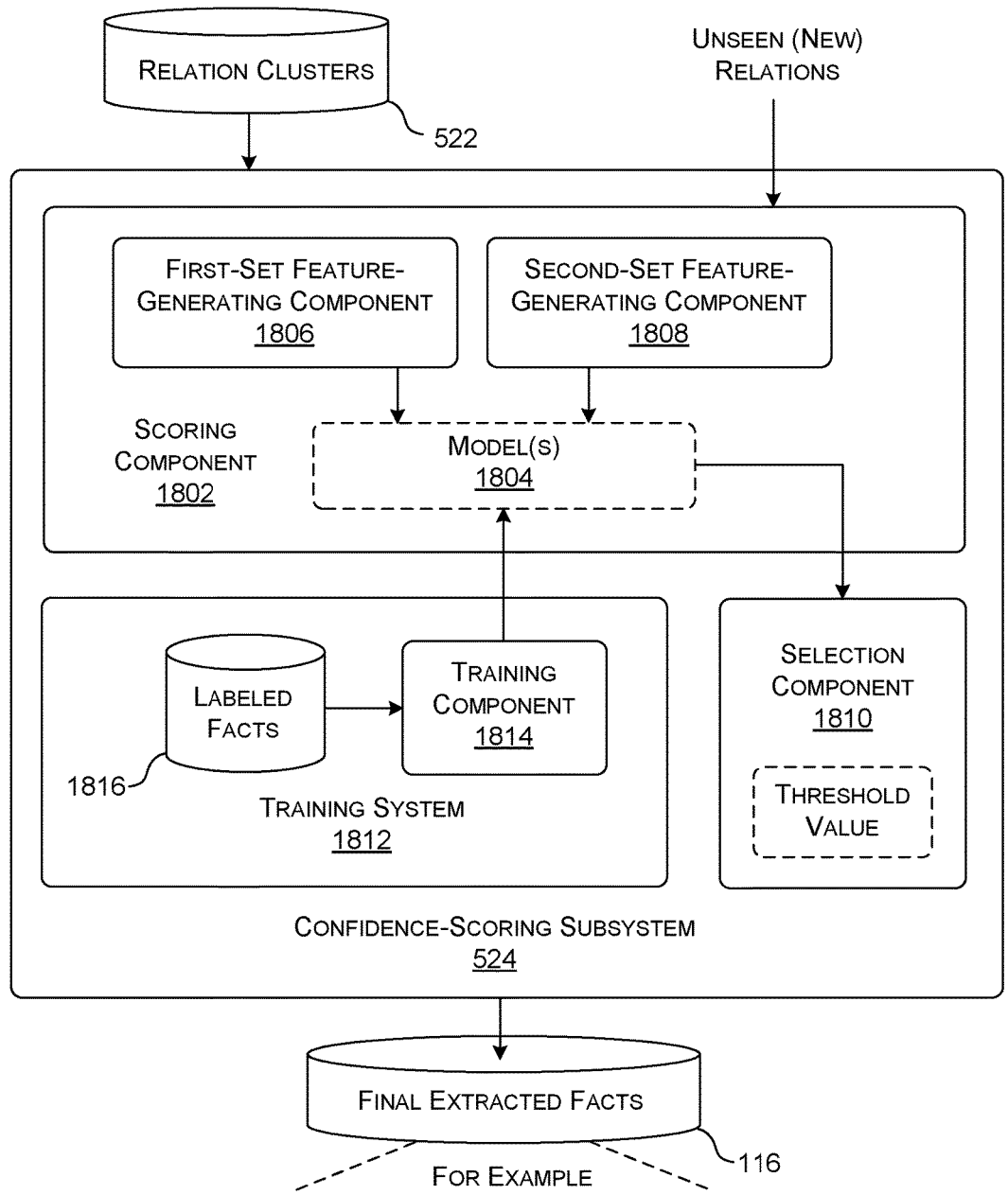
FIG. 18 shows one implementation of a confidence-scoring subsystem, which is another component of the fact-extracting system of FIG. 5.

FIG. 18 shows one implementation of the confidence-scoring subsystem 524. The confidence-scoring subsystem 524 assigns confidence score information to each relation triple in the relation clusters. Generally, the confidence score information reflects a degree of certainty associated with a relation triple, which depends at least on a system-specific certainty at which the pipeline has detected the relation triple, and a statistical measure (e.g., a frequency measure, etc.) of the occurrence of the relation triple within the collection of information items.

In one implementation, a scoring component 1802 uses a machine-trained model 1804, such as a logistic regression model, to generate the confidence score information for a candidate relation triple. The model 1804 may receive two sets of feature values (feature signals) as input. A first set of feature values describes subsystem-originating score information collected by the various preceding stages of the pipeline. The second set of feature values describes statistical information (e.g., frequency information, etc.) associated with the candidate relation triple. A first-set feature-generating component 1806 generates the first set of feature values, while a second-set feature-generating component 1808 generates the second set of feature values.

More specifically, the first set of feature values can reflect any score information provided by the corpus-providing subsystem 502, the entity-recognizing subsystem 508, the relation-extracting subsystem 512, the argument-merging subsystem 516, and/or the relation-clustering subsystem 520. For example, assume that the relation triple under consideration expresses the fact, "Facebook acquired Instagram." Further assume that this fact was expressed in a subset of documents, taken from the collection of documents, received by the corpus-providing subsystem 502. The first set of feature values can reflect: (1) the confidence at which the corpus-providing subsystem 502 has classified the subset of documents as being related to a desired target domain (e.g., software); (2) the confidence at which the entity-recognizing subsystem 508 classifies "Facebook" and "Instagram" as named entities; (3) the confidence at which the relation-extracting subsystem 512 can parse the sentences containing the identified relation triple; (4) the confidence at which the argument-merging subsystem 516 assesses the similarity between pairs of entities, and so on. The second set of feature values can provide a statistical summary of the occurrence of the relation triple within the collection of documents, such as the number of occurrences of the relation triple "Facebook acquired Instagram" within the collection of documents, the number of occurrences of the named entity "Facebook" by itself within the collection of documents, the number of occurrences of the named entity "Instagram" by itself within the collection of documents, and so on.

A selection component 1810 compares the confidence score information for each relation triple with an environment-specific threshold value. If the confidence score information satisfies (e.g., exceeds) the threshold value, then the confidence-scoring subsystem 524 accepts the relation triple as a qualifying fact.

Altogether, the feature values help eliminate both untruthful (and logically inconsistent, meaningless, etc.) "facts," as well as irrelevant facts. For example, a "fact" corresponding to the triple <"Mitt Romney," "won," "presidential election"> might have feature values indicating that it was detected by the fact-extracting system 104 with a relatively low degree of confidence (since it is likely based on an erroneous interpretation of a sentence). In addition, this fact may have feature values indicating that it is not a frequently-occurring piece of information (because it is readily ascertainable as being untrue). The model 1804 would therefore likely assign a low score to this fact, and the selection component 1810 would likely eliminate this fact on this basis. The fact <"John Smith," "voted for," "Mitt Romney"> might have feature values indicating that it was detected with a high degree of confidence. But if "John Smith" is not a famous person, the fact will likely have feature values indicating that it is not a frequently-occurring piece of information. The model 1804 would therefore likely assign a low score to this fact, and the selection component 1810 would likely eliminate this fact on this basis.

A training system 1812 uses a training component 1814 to generate the trained model 1804 based on a training set provided in a data store 1816. The training set contains a set of training examples. Each training example describes a relation triple, a label that conveys whether this triple is positive (i.e., true and relevant) or negative (i.e., not true and/or not relevant), and a first set of feature values and a second set of feature values pertaining to the relation triple.

Note that a trained model 1804 developed for a first domain (e.g., a software-related domain) will generally be applicable to other domains. As such, a developer is not required to repeat the model training operation performed by the training system 1812 for different respective domains, although the developer may choose to do so in some cases. Indeed, in some implementations, the only domain-specific model in the fact-extracting pipeline corresponds to the trained model 606 used by the domain classifier 604 (of FIG. 6). The (mostly) domain-agnostic nature of the fact-extracting pipeline is one factor that contributes to its scalability and ease of use across different domains and contexts.

A.8. Feed-Processing Functionality

Figure 19:
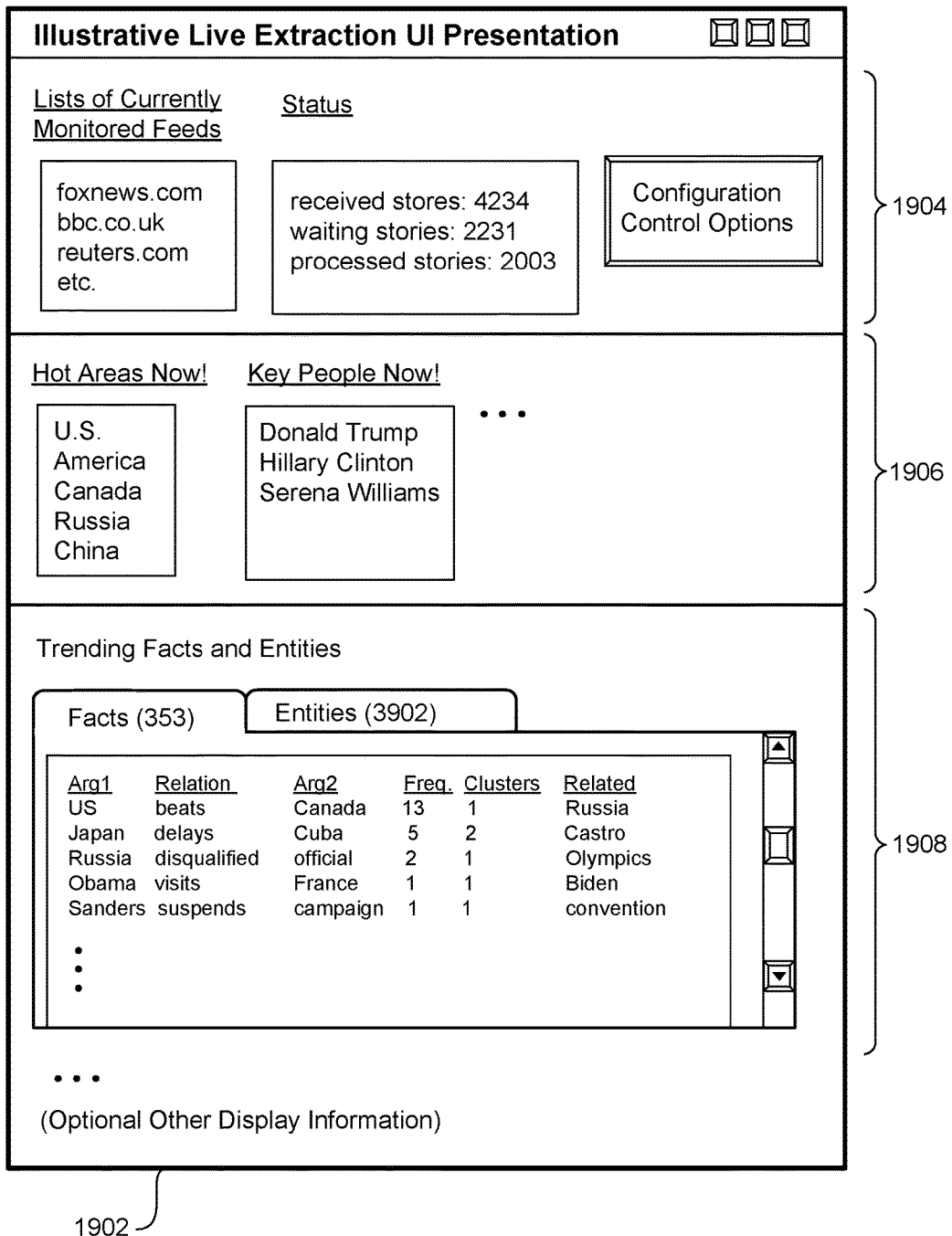
FIG. 19 shows a user interface presentation that presents results generated by the fact-extracting system of FIG. 5, in response to processing one or more information feeds.

FIG. 19 shows an illustrative user interface (UI) presentation 1902 generated by one type of knowledge-consuming application. The user interface presentation 1902 shows results generated by the fact-extracting system 104 of FIG. 5, in response to processing one or more information feeds. The user interface presentation 1902 provides a metaphorical dashboard by which a user is informed of facts extracted from a stream of information items. More specifically, in those cases in which the information items correspond to news stories, the user interface presentation 1902 provides a dynamic summary of current events. Note that the UI features of the user interface presentation 1902 shown in FIG. 19 are set forth in the spirit of illustration, not limitation; other implementations can vary the selection of features, the arrangement of features, and/or the appearance of features, etc., compared to the example shown in FIG. 19.

A first presentation portion 1904 describes the current configuration and status of the fact-extracting system 104. For example, the first presentation portion 1904 identifies the information feeds being received, and the status of the information items that have been received. The first presentation portion 1904 can also include any type of graphical control(s) for modifying the configuration in any manner, e.g., by adding or removing information feeds, changing the size of the time window $W_{current}$, etc.

A second presentation portion 1906 describes trending topics. For example, the second presentation portion identifies trending locations and trending people. The fact-extracting system 104 can determine these trending topics by counting the number of times that different entity names appear in the facts, and then ranking the entity names based on the thus-determined counts.

A third presentation portion 1908 can identify trending facts. For example, the third presentation 1908 shows that a top-ranking fact conveys that the United States has beaten Canada in some sporting match. The fact-extracting system 104 ranks this fact as the highest because it appears in numerous news items describing this event within the last 24 hours, and because the fact-extracting system 104 is able to ascertain this fact with a relatively high degree of confidence.

A "Related" field describes an entity name that is related to a fact. For example, the user interface presentation 1902 indicates that the top-ranking fact <"US," "beats," "Canada"> is related to the entity name "Russia." The fact-extracting system 104 identifies "Russia" as a related named entity based on a determination that, in one or more instances, "Russia" is a named entity that is extracted from the same sentences as the fact <"US," "beats," "Canada">.

B. Illustrative Processes

FIGS. 20-23 show processes that explain the operation of the fact-extracting system 104 of Section A in flowchart form. Since the principles underlying the operation of the fact-extracting system 104 have already been described in Section A, certain operations will be addressed in summary fashion in this section. As noted in the prefatory part of the Detailed Description, the flowchart is expressed as a series of operations performed in a particular order. But the order of these operations is merely representative, and can be varied in any manner.

Figure 20:
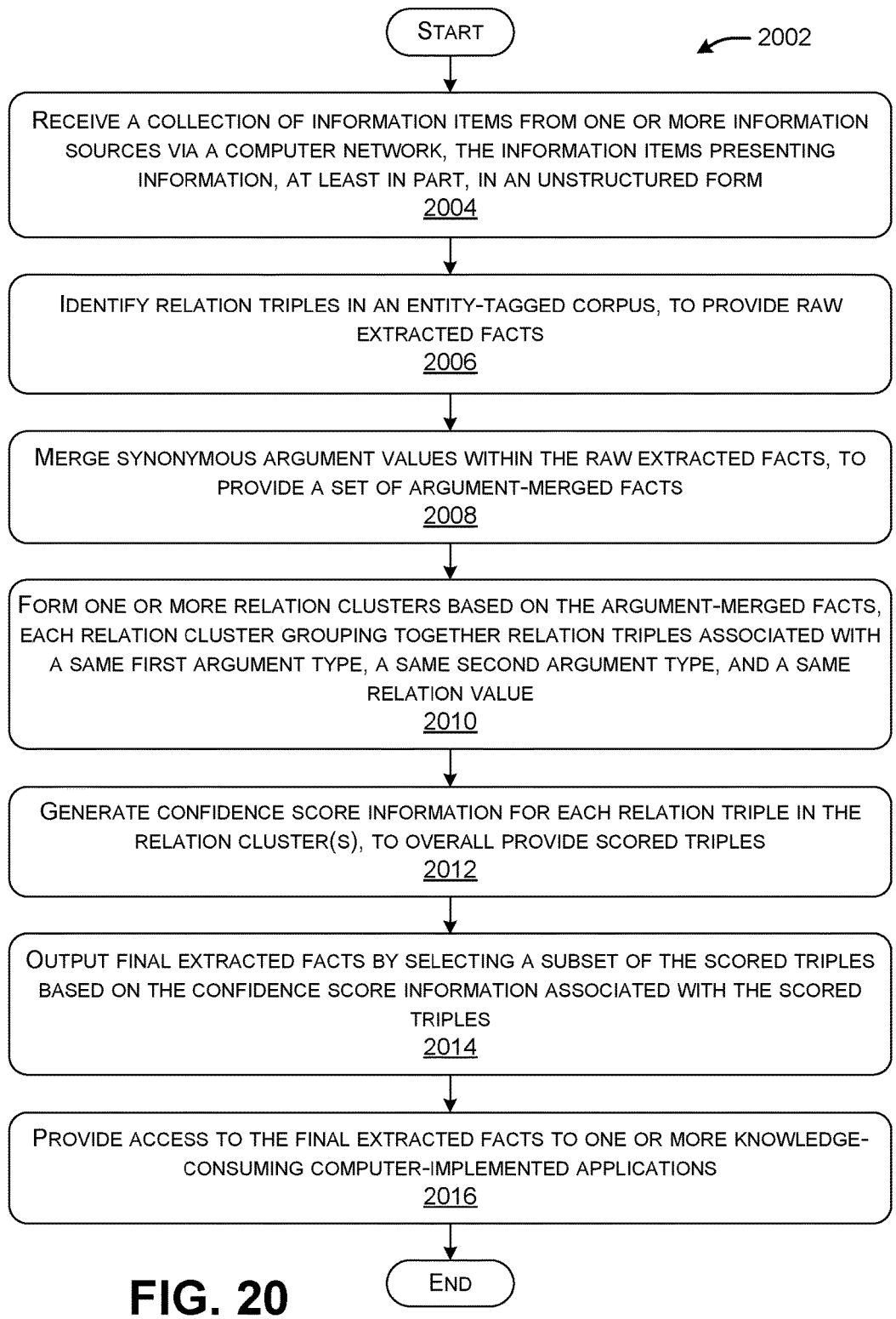
FIG. 20 is a flowchart that shows an overview of one manner of operation of the fact-extracting system of FIG. 5.

FIG. 20 is a process 2002 that shows an overview of one manner of operation of the fact-extracting system 104 of FIG. 5. In block 2004, the fact-extracting system 104 receives a collection of information items from one or more information sources 106 via the computer network 204. The information items present information, at least in part, in an unstructured form. In block 2006, the fact-extracting system 104 identifies relation triples in an entity-tagged corpus, to provide raw extracted facts. The entity-tagged corpus is derived from the collection of information items received via the above-referenced receiving operation. Each relation triple identifies a first argument value associated with a first named entity that corresponds to a subject, a second argument value associated with a second named entity that corresponds to an object, and a relation value that reflects a relationship between the first named entity and the second named entity.

In block 2008, the fact-extracting system 104 merges synonymous argument values within the raw extracted facts, to provide a set of argument-merged facts. In block 2010, the fact-extracting system 104 forms one or more relation clusters based on the argument-merged facts, each relation cluster grouping together relation triples associated with a same first argument type, a same second argument type, and a same relation value. In block 2012, the fact-extracting system 104 generates confidence score information for each relation triple in the relation cluster(s), to overall provide scored triples. In block 2014, the fact-extracting system 104 outputs final extracted facts by selecting a subset of the scored triples based on the confidence score information associated with the scored triples. In block 2016, the fact-extracting system 104 provides access to the final extracted facts to one or more knowledge-consuming computer-implemented applications.

Figure 21:
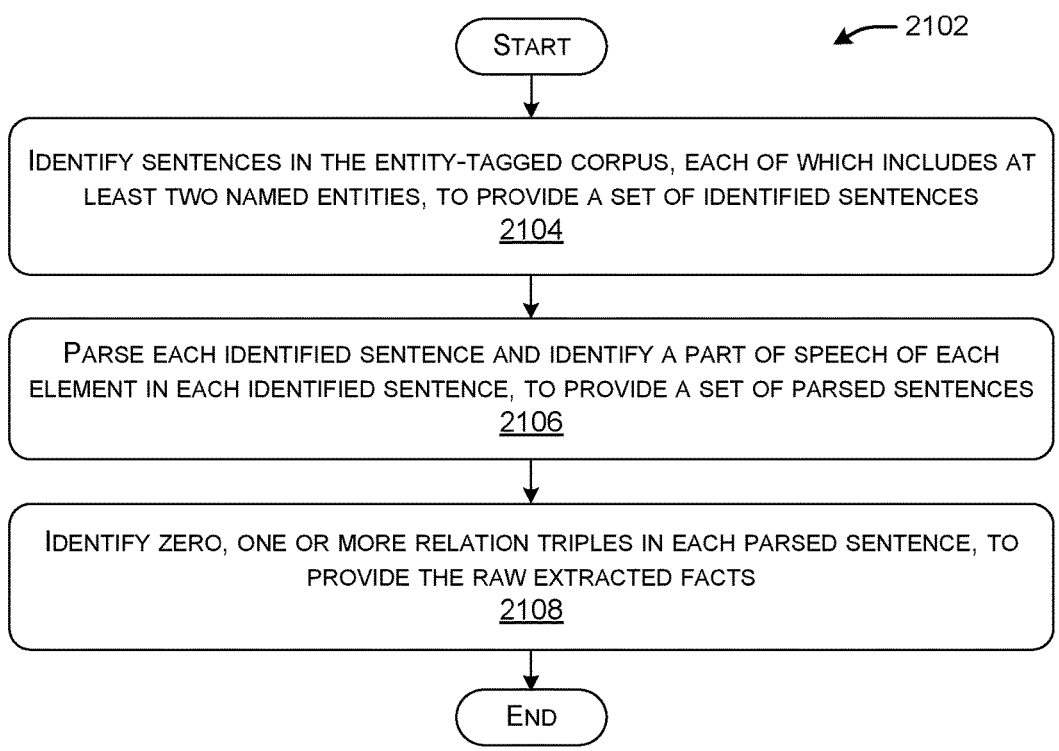
FIG. 21 is a flowchart that shows one manner of operation of the relation-extracting subsystem of FIG. 10.

FIG. 21 shows a process 2102 that describes one manner of operation of the relation-extracting subsystem 512 of FIG. 10. In block 2104, the relation-extracting subsystem 512 identifies sentences in the entity-tagged corpus, each of which includes at least two named entities, to provide a set of identified sentences. In block 2106, the relation-extracting subsystem 512 parses each identified sentence and identifies a part of speech of each element in each identified sentence, to provide a set of parsed sentences. In block 2108, the relation-extracting subsystem 512 identifies zero, one or more relation triples in each parsed sentence, to overall provide the raw extracted facts.

Figure 22:
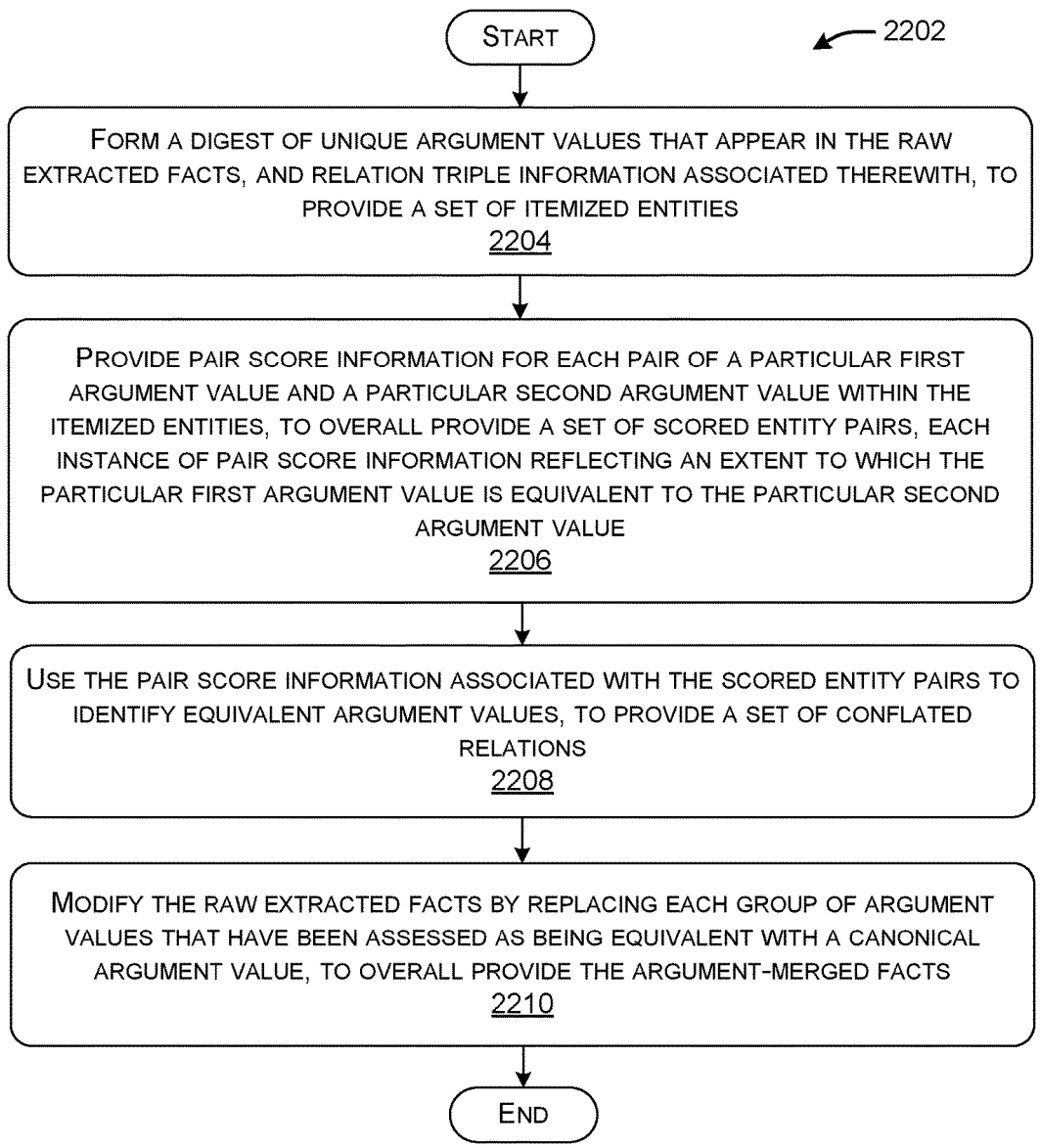
FIG. 22 is a flowchart that shows one manner of operation of the argument-merging subsystem of FIG. 13.

FIG. 22 is a process 2202 that describes one manner of operation of the argument-merging subsystem 516 of FIG. 13. In block 2204, the argument-merging subsystem 516 forms a digest of unique argument values that appear in the raw extracted facts, and relation triple information associated therewith, to provide a set of itemized entities. In block 2206, the argument-merging subsystem 516 provides pair score information for each pair of a particular first argument value and a particular second argument value within the itemized entities, to overall provide a set of scored entity pairs. Each instance of pair score information reflects an extent to which the particular first argument value is equivalent to the particular second argument value. In block 2208, the argument-merging subsystem 516 uses the pair score information associated with the scored entity pairs to identify equivalent argument values, to provide a set of conflated relations. In block 2210, the argument-merging subsystem 516 modifies the raw extracted facts by replacing each group of argument values that have been assessed as being equivalent with a canonical argument value, to overall provide the argument-merged facts.

Figure 23:
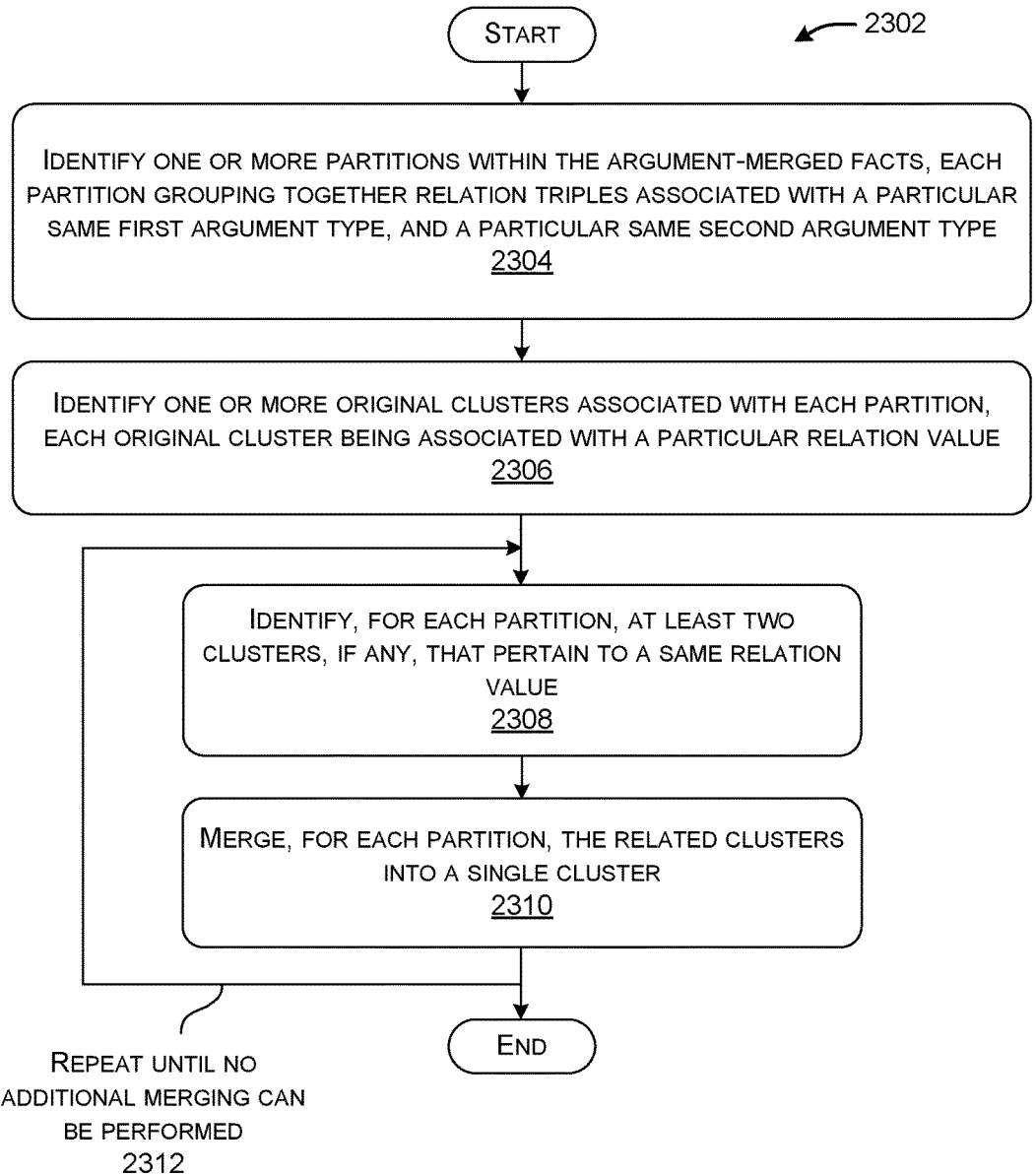
FIG. 23 is a flowchart that shows one manner of operation of the relation-clustering subsystem of FIG. 16.

FIG. 23 is a process 2302 that describes one manner of operation of the relation-clustering subsystem 520 of FIG. 16. In block 2304, the relation-clustering subsystem 520 identifies one or more partitions within the argument-merged facts, each partition grouping together relation triples associated with a particular same first argument type and a particular same second argument type. In block 2306, the relation-clustering subsystem 520 identifies one or more original clusters associated with each partition, each original cluster being associated with a particular relation value. In block 2308, the relation-clustering subsystem 520 identifies, for each partition, at least two clusters, if any, that pertain to a same relation value. In block 2310, the relation-clustering subsystem 520 merges, for each partition, each pairing of clusters identified in block 2308 into a single cluster. Block 2312 indicates that blocks 2308 and 2310 are repeated until no additional relation clusters can be combined together.

Overall, the technique offers several advantages. Any given implementation can exploit any one or more of these advantages.

First, the technique has wide applicability. For instance, the technique greatly enlarges the universe of available information from which facts can be extracted by processing unstructured information. The technique accomplishes this feature using the processing pipeline described above, which provides a way of distilling information presented in many different forms into relevant facts. This solves a significant technical problem because unstructured information, in its natural state, contains no simple markers that point out what pieces of information constitute facts, and what facts qualify as accurate and significant facts. Further, the technique successfully extracts facts from a wide variety of sources, including any combination of web content sources, information feeds, social network systems, enterprise systems, etc.

Second, the technique extracts facts in an efficient manner, thereby facilitating a developer's task in generating and updating a knowledge base. For instance, the technique operates in a largely unsupervised manner (and a sometimes entirely unsupervised manner), thereby minimizing or entirely eliminating manual effort by a developer. Further, the technique is scalable because a developer can quickly configure the pipeline to process information for a particular subject matter domain. Thereafter, the developer can quickly extend the pipeline to other subject matter domains with minimal manual effort. For example, the developer can adapt the fact-extracting pipeline to a new domain by selecting a few seed examples and submitting them to the seed retrieval component 702 of FIG. 7; the fact-extracting pipeline requires no additional manual configuration effort. Further, by virtue of the confidence-scoring subsystem 524 and other features, the technique provides facts that have a high-probability of being correct and relevant to a given general audience. This aspect reduces the time, effort and cost associated with verifying the quality of final extracted facts. Indeed, in many cases, a developer may devote no additional effort to verifying the accuracy of the facts generated by the technique, since the technique already provides built-in assurance of the high quality of its facts.

Third, the technique empowers both application developers and end users. For instance, the technique improves the depth, accuracy and freshness of a knowledge base. This characteristic allows an application developer to improve the performance of any knowledge-consuming application that relies on the knowledge base. This characteristic also benefits any user who directly or indirectly interacts with such a knowledge base. For instance, the technique increases the efficiency of an end user who interacts with a knowledge-consuming application, e.g., by quickly providing an accurate answer to the user's query. Further, the technique extracts facts in an efficient and expeditious manner. This provides a way of keeping the user apprised of dynamically changing events in a real-time or near-real-time manner.

Fourth, the technique utilizes system resources in an efficient manner. For instance, because the technique produces facts in an efficient manner, the technique allows a developer to forego a more extended effort to generate and verify facts; consequentially, this saving also eliminates the consumption of resources that would be required by that extended effort. Further, because the technique delivers facts to an end user in an efficient manner, the technique allows an end user to forego an extended search session to hunt for the facts; consequentially, this saving also eliminates the consumption of resources that would be required by that extended search session.

The above-described advantages are cited by way of illustration, not limitation.

C. Representative Computing Functionality

Figure 24:
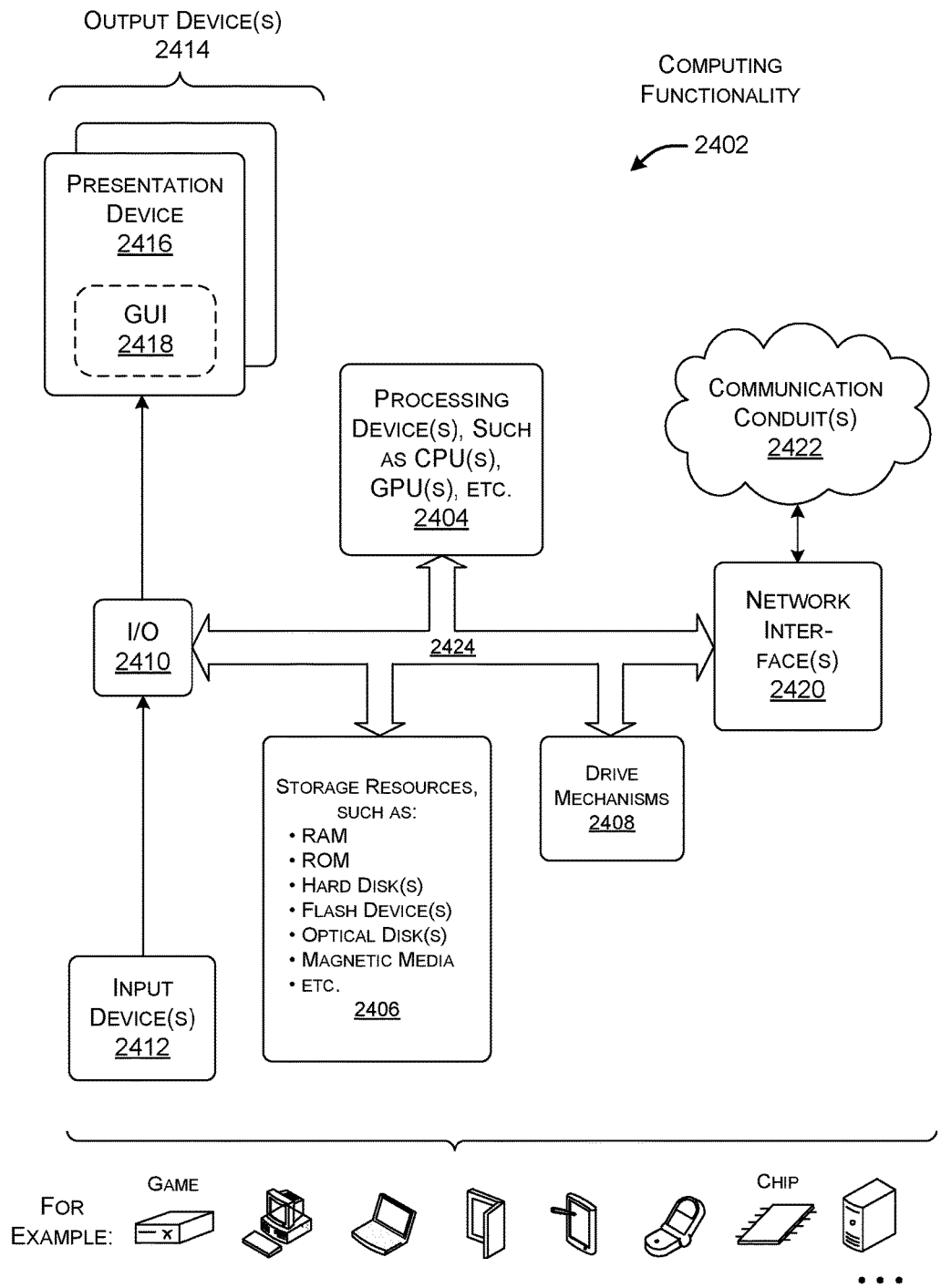
FIG. 24 shows illustrative computing functionality that can be used to implement any aspect of the features shown in the foregoing drawings.

FIG. 24 shows computing functionality 2402 that can be used to implement any aspect of the mechanisms set forth in the above-described figures. For instance, the type of computing functionality 2402 shown in FIG. 24 can be used to implement any of the information sources 106, fact-extracting system 104, the knowledge base updating system 118, the knowledge-consuming applications 122, the local computing device 202, etc. Generally, note that the set of features described in FIG. 24 is illustrative, and that any particular manifestation of the computing functionality 2402 can omit one or more of the features shown in FIG. 24, and/or add one or more features that are not illustrated in FIG. 24. In all cases, the computing functionality 2402 represents one or more physical and tangible processing mechanisms.

The computing functionality 2402 can include one or more hardware processor devices 2404, such as one or more central processing units (CPUs), and/or one or more graphical processing units (GPUs), and so on. The computing functionality 2402 can also include any storage resources (also referred to as computer-readable storage media or computer-readable storage medium devices) 2406 for storing any kind of information, such as machine-readable instructions, settings, data, etc. Without limitation, for instance, the storage resources 2406 may include any of RAM of any type(s), ROM of any type(s), flash devices, hard disks, optical disks, and so on. More generally, any storage resource can use any technology for storing information. Further, any storage resource may provide volatile or non-volatile retention of information. Further, any storage resource may represent a fixed or removable component of the computing functionality 2402. The computing functionality 2402 may perform any of the functions described above when the hardware processor device(s) 2404 carry out computer-readable instructions stored in any storage resource or combination of storage resources. For instance, the computing functionality 2402 can perform the blocks described in the flowcharts of Section B by executing computer-readable instructions that implement the respective blocks. In some implementations, the computing functionality 2402 also optionally includes one or more drive mechanisms 2408 for interacting with any storage resource, such as a hard disk drive mechanism, an optical disk drive mechanism, and so on.

In some user device-related manifestations, the computing functionality 2402 also includes an input/output component 2410 for receiving various inputs (via input devices 2412), and for providing various outputs (via output devices 2414). Illustrative input devices include a keyboard device, a mouse input device, a touchscreen input device, and so on. One particular output mechanism may include a display device 2416 and an associated graphical user interface presentation (GUI) 2418. The display device 2416 may correspond to a charge-coupled display device, a cathode ray tube device, a projection mechanism, etc. The computing functionality 2402 can also include one or more network interfaces 2420 for exchanging data with other devices via one or more communication conduits 2422. One or more communication buses 2424 communicatively couple the above-described components together.

The communication conduit(s) 2422 can be implemented in any manner, e.g., by a local area computer network, a wide area computer network (e.g., the Internet), point-to-point connections, etc., or any combination thereof. The communication conduit(s) 2422 can include any combination of hardwired links, wireless links, routers, gateway functionality, name servers, etc., governed by any protocol or combination of protocols.

Alternatively, or in addition, any of the functions described in the preceding sections can be performed, at least in part, by one or more hardware logic components. For example, without limitation, the computing functionality 2402 (and its hardware processor) can be implemented using one or more of: Field-programmable Gate Arrays (FPGAs); Application-specific Integrated Circuits (ASICs); Application-specific Standard Products (ASSPs); System-on-a-chip systems (SOCs); Complex Programmable Logic Devices (CPLDs), etc. In this case, the machine-executable instructions are embodied in the hardware logic itself.

The following summary provides a non-exhaustive list of illustrative aspects of the technology set forth herein.

According to a first aspect, a system is described herein for extracting facts. The system includes an interface component configured to receive a collection of information items from one or more information sources via a computer network, the information items presenting information, at least in part, in an unstructured form. The system further includes a relation-extracting subsystem configured to identify relation triples in an entity-tagged corpus, to provide raw extracted facts. The entity-tagged corpus is derived from the collection of information items received via the interface component. Each relation triple identifies a first argument value associated with a first named entity that corresponds to a subject, a second argument value associated with a second named entity that corresponds to an object, and a relation value which reflects a relationship between the first named entity and the second named entity. The system also includes a relation-clustering subsystem configured to form one or more relation clusters based on the identified relations, each relation cluster grouping together relation triples associated with a same first argument type, a same second argument type, and a same relation value. The system also includes a confidence-scoring subsystem configured to: generate confidence score information for each relation triple in the above-referenced one or more relation clusters, to overall provide scored triples; and output final extracted facts by selecting a subset of the scored triples based on the confidence score information associated with the scored triples. The system further includes a data store for storing the final extracted facts. Each of the interface component, the relation-extracting subsystem, the relation-clustering subsystem and the confidence-scoring subsystem are implemented by one or more computing devices. Further, the final extracted facts in the data store are accessible to an end user who interacts with a knowledge-consuming application via a user computing device, the user computing device being coupled to the computer network.

According to a second aspect, the system further includes a corpus-providing subsystem that is configured to extract the collection of items from a body of network-accessible content, the collection of items pertaining to a particular subject matter domain.

According to a third aspect, the system further includes a corpus-providing subsystem that is configured to receive the collection of items from one or more information feeds.

According to a fourth aspect, the relation-extracting system includes: a sentence-identifying component configured to identify sentences in the entity-tagged corpus, each of which includes at least two named entities, to provide a set of identified sentences; a sentence-parsing component configured to parse each identified sentence and to identify a part of speech of each element in each identified sentence, to provide a set of parsed sentences; and a fact-identifying component configured to identify zero, one or more relation triples in each parsed sentence, to provide the raw extracted facts.

According to a fifth aspect, the above-referenced fact-identifying component is configured to identify each relation triple in a parsed sentence by using a pattern to find a part of the parsed sentence that expresses a relation, and then finding a subject noun phrase head and an object noun phrase head within the sentence that are associated with the relation that has been found.

According to a sixth aspect, the system further includes an argument-merging subsystem configured to merge synonymous argument values within the raw extracted facts, to provide a set of argument-merged facts.

According to a seventh aspect, the argument-merging subsystem includes: an entity-itemizing component configured to form a digest of unique argument values that appear in the raw extracted facts, and relation triple information associated therewith, to provide a set of itemized entities; a relation-scoring component configured to provide pair score information for each pair of a particular first argument value and a particular second argument value within the itemized entities, to overall provide a set of scored entity pairs, each instance of pair score information reflecting an extent to which the particular first argument value is equivalent to the particular second argument value; an equivalence-determining component configured to use the pair score information associated with the scored entity pairs to identify equivalent argument values, to provide a set of conflated relations; and a replacement component configured to modify the raw extracted facts by replacing each group of argument values that have been assessed as being equivalent with a canonical argument value, to overall provide the argument-merged facts.

According to an eighth aspect, the pair score information has plural score-related dimensions, including: a first measure which reflects an extent to which relation triple information associated with the particular first argument value overlaps with relation triple information associated with the particular second argument value; a second measure which reflects a text-based relation between the particular first argument value and the particular second argument value; and third measure which reflects a relation between a number of occurrences of the particular first argument value and a number of occurrences of the particular second argument value.

According to a ninth aspect, the relation-clustering component includes: a first-pass clustering component configured to identify one or more partitions within the raw extracted facts, each partition grouping together relation triples associated with a particular same first argument type and a particular same second argument type; and a splitter component configured to identify one or more original clusters associated with each partition, each original cluster being associated with a particular relation value.

According to a tenth aspect, the relation-clustering component further includes an action-merging component configured to, with respect to each partition: identify at least two clusters within the partition, if any, that pertain to a same relation value; and merge the above-referenced at least two clusters into a single cluster.

According to an eleventh aspect, the above-referenced action-merging component is configured to identify the above-referenced at least two clusters by forming an intersection of the above-referenced at least two clusters, and determining whether the intersection satisfies a prescribed intersection threshold.

According to a twelfth aspect, the action-merging component is configured to iteratively perform the above-referenced identifying and merging until it determines that no additional clusters can be merged, to overall provide the above-referenced one or more relation clusters.

According to a thirteenth aspect, the confidence-scoring subsystem generates the confidence score information for each particular relation triple in the above-referenced one or more relation clusters based on a first set of feature values and a second set of feature values. The first set of feature values includes subsystem-originating confidence score information that is provided by one or more prior subsystems in a pipeline of operations defined by the system. The second set of feature values provides a statistical measure of the occurrence of the particular relation triple and/or a part thereof within the collection of information items.

According to a fourteenth aspect, the collection of information items that is used to derive the entity-tagged corpus pertains to a particular subject matter domain. Further, a configuration pertaining to the particular subject matter domain is, at least in part, scalable to other subject matter domains.

According to a fifteenth aspect, a method is described, implemented by one or more computing devices, for extracting facts. The method includes receiving a collection of information items from one or more information sources via a computer network, the information items presenting information, at least in part, in an unstructured form. The method further includes identifying relation triples in an entity-tagged corpus, to provide raw extracted facts. The entity-tagged corpus is derived from the collection of information items received via the above-referenced receiving operation, and each relation triple identifies a first argument value associated with a first named entity that corresponds to a subject, a second argument value associated with a second named entity that corresponds to an object, and a relation value which reflects a relationship between the first named entity and the second named entity. The method further includes merging synonymous argument values within the raw extracted facts, to provide a set of argument-merged facts. The method further includes forming one or more relation clusters based on the argument-merged facts, each relation cluster grouping together relation triples associated with a same first argument type, a same second argument type, and a same relation value. The method further includes generating confidence score information for each relation triple in the above-referenced one or more relation clusters, to overall provide scored triples. The method further includes outputting final extracted facts by selecting a subset of the scored triples based on the confidence score information associated with the scored triples. The method further includes providing access to the final extracted facts to one or more knowledge-consuming computer-implemented applications. The above-referenced identifying, merging, forming, generating, and outputting are scalable across plural subject matter domains.

According to a sixteenth aspect, the above-referenced identifying relation triples includes: identifying sentences in the entity-tagged corpus, each of which includes at least two named entities, to provide a set of identified sentences; parsing each identified sentence and identifying a part of speech of each element in each identified sentence, to provide a set of parsed sentences; and identifying zero, one or more relation triples in each parsed sentence, to provide the raw extracted facts.

According to a seventeenth aspect, the above-referenced merging includes: forming a digest of unique argument values that appear in the raw extracted facts, and relation triple information associated therewith, to provide a set of itemized entities; providing pair score information for each pair of a particular first argument value and a particular second argument value within the itemized entities, to overall provide a set of scored entity pairs, each instance of pair score information reflecting an extent to which the particular first argument value is equivalent to the particular second argument value; using the pair score information associated with the scored entity pairs to identify equivalent argument values, to provide a set of conflated relations; and modifying the raw extracted facts by replacing each group of argument values that have been assessed as being equivalent with a canonical argument value, to overall provide the argument-merged facts.

According to an eighteenth aspect, the above-referenced forming includes: identifying one or more partitions within the argument-merged facts, each partition grouping together relation triples associated with a particular same first argument type, and a particular same second argument type; identifying one or more original clusters associated with each partition, each original cluster being associated with a particular relation value; identifying, for each partition, at least two clusters, if any, that pertain to a same relation value; and merging, for each partition, the above-referenced at least two clusters into a single cluster.

According to a nineteenth aspect, the above-referenced generating includes generating the confidence score information for each particular relation triple in the above-referenced one or more relation clusters based on a first set of feature values and a second set of feature values. The first set of feature values includes subsystem-originating confidence score information that is provided by one or more prior subsystems in a pipeline of operations performed by the method. The second set of feature values provides a statistical measure of the occurrence of the particular relation triple and/or a part thereof within the collection of information items.

According to a twentieth aspect, a computer-readable storage medium is described herein for storing computer-readable instructions. The computer-readable instructions, when executed by one or more processor devices, perform a method that includes receiving a collection of information items from one or more information sources via a computer network, the information items presenting information, at least in part, in an unstructured form. The method further includes forming one or more relation clusters of relation triples. The relation triples are derived from the collection of information items received via the above-referenced receiving. Each such relation triple identifies a first argument value associated with a first named entity that corresponds to a subject, a second argument value associated with a second named entity that corresponds to an object, and a relation value which reflects a relationship between the first named entity and the second named entity. Each relation cluster groups together relation triples associated with a same first argument type, a same second argument type, and a same relation value. The method further includes generating confidence score information for each relation triple in the above-referenced one or more relation clusters, to overall provide scored triples. The method further includes outputting final extracted facts by selecting a subset of the scored triples based on the confidence score information.

A twenty-first aspect corresponds to any combination (e.g., any permutation or subset) of the above-referenced first through twentieth aspects.

A twenty-second aspect corresponds to any method counterpart, device counterpart, system counterpart, means-plus-function counterpart, computer-readable storage medium counterpart, data structure counterpart, article of manufacture counterpart, graphical user interface presentation counterpart, etc. associated with the first through twenty-first aspects.

In closing, the functionality described herein can employ various mechanisms to ensure that any user data is handled in a manner that conforms to applicable laws, social norms, and the expectations and preferences of individual users. For example, the functionality can allow a user to expressly opt in to (and then expressly opt out of) the provisions of the functionality. The functionality can also provide suitable security mechanisms to ensure the privacy of the user data (such as data-sanitizing mechanisms, encryption mechanisms, password-protection mechanisms, etc.).

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A system comprising: a processing device; and
a computer-readable storage medium storing machine-readable instructions which, when executed by the processing device, cause the processing device to:
identify a plurality of sentences in an entity-tagged corpus that include at least two tagged entities, wherein the entity-tagged corpus is derived from a collection of information items that include unstructured information comprising the plurality of sentences;
parse the plurality of sentences to obtain parsed sentences representing parts of individual sentences as parse trees;
identify a plurality of relations in the parsed sentences, wherein respective relations identify a first argument value associated with a first named entity that corresponds to a subject expressed in a respective parsed sentence, a second argument value associated with a second named entity that corresponds to an object expressed in the respective parsed sentence, and a relation value which reflects a corresponding relationship expressed in the respective parsed sentence, the corresponding relationship being between the first named entity and the second named entity;
form one or more relation clusters based at least on the identified relations, respective relation clusters grouping together relations associated with a same first argument type expressed in the unstructured information, a same second argument type expressed in the unstructured information, and a same relation value expressed in the unstructured information;
generate confidence score information for the relations in said one or more relation clusters to provide scored relations, wherein the confidence score information reflects relative confidence that individual relations express factually true relationships between individual subjects and individual objects and the confidence score information is based at least on a parsing confidence reflecting confidence in the parsing of the plurality of sentences to obtain the parse trees;
output final extracted facts by selecting a subset of the scored relations based at least on the confidence score information; and
store the final extracted facts in a data store,
the final extracted facts in the data store being accessible via a user computing device coupled to a computer network.

2. The system of claim 1, wherein the machine-readable instructions, when executed by the processing device, cause the processing device to:
extract the collection of information items from a body of network-accessible content, the collection of information items pertaining to a particular subject matter domain; and
derive the entity-tagged corpus from the collection of information items.

3. The system of claim 1, wherein the machine-readable instructions, when executed by the processing device, cause the processing device to:
receive the collection of information items from one or more information feeds.

4. The system of claim 1, wherein the machine-readable instructions, when executed by the processing device, cause the processing device to:
parse the plurality of sentences to obtain one or more candidate parse trees for each of the individual sentences; and
identify a selected parse tree from the candidate parse trees for each of the individual sentences.

5. The system of claim 4, wherein the machine-readable instructions, when executed by the processing device, cause the processing device to:
identify a particular relation in a particular parsed sentence by using the selected parse tree for the particular parsed sentence to find a part of the particular parsed sentence that expresses the particular relation, a subject noun phrase head, and an object noun phrase head.

6. The system of claim 1, wherein the machine-readable instructions, when executed by the processing device, cause the processing device to:
merge synonymous argument values within the parsed sentences to provide a set of argument-merged facts.

7. The system of claim 6, wherein the machine-readable instructions, when executed by the processing device, cause the processing device to:
form a digest of unique argument values that appear in the parsed sentences, and relation information associated therewith, to provide a set of itemized entities;
provide pair score information for each pair of a particular first argument value and a particular second argument value within the itemized entities, to overall provide a set of scored entity pairs, each instance of pair score information reflecting an extent to which the particular first argument value is equivalent to the particular second argument value;
use the pair score information associated with the scored entity pairs to identify equivalent argument values, to provide a set of conflated relations; and
replace each group of argument values that have been assessed as being equivalent with a canonical argument value, to overall provide the argument-merged facts.

8. The system of claim 7, wherein the pair score information has plural score-related dimensions, including: a first measure which reflects an extent to which relation information associated with the particular first argument value overlaps with relation information associated with the particular second argument value; a second measure which reflects a text-based relation between the particular first argument value and the particular second argument value; and third measure which reflects a given relation between a number of occurrences of the particular first argument value and a number of occurrences of the particular second argument value.

9. The system of claim 1, wherein the machine-readable instructions, when executed by the processing device, cause the processing device to:

identify one or more partitions within the plurality of relations, each partition grouping together particular relations associated with a particular same first argument type and a particular same second argument type; and identify one or more original clusters associated with each partition, each original cluster being associated with a particular relation value.

10. The system of claim 9, wherein the machine-readable instructions, when executed by the processing device, cause the processing device to:

with respect to each partition: identify at least two clusters within the partition, if any, that pertain to a same relation value; and merge said at least two clusters into a single cluster.

11. The system of claim 10, wherein machine-readable instructions, when executed by the processing device, cause the processing device to:

identify said at least two clusters by forming an intersection of said at least two clusters, and determining whether the intersection satisfies a prescribed intersection threshold.

12. The system of claim 10, wherein the machine-readable instructions, when executed by the processing device, cause the processing device to:

iteratively identify and merge the at least two clusters until no additional clusters can be merged, to overall provide said one or more relation clusters.

13. The system of claim 1, wherein the machine-readable instructions, when executed by the processing device, cause the processing device to:

generate the confidence score information for each particular relation in said one or more relation clusters based at least on a first set of feature values and a second set of feature values, the first set of feature values including subsystem-originating confidence score information that is provided by one or more prior subsystems in a pipeline of operations defined by the system, and the second set of feature values provides a statistical measure of the occurrence of the particular relation and/or a part thereof within the collection of information items.

14. The system of claim 1, wherein the machine-readable instructions, when executed by the processing device, cause the processing device to:

use a domain classifier to select the collection of information items for a particular subject matter domain.

15. A method implemented by one or more computing devices, the method comprising:

receiving a collection of information items from one or more information sources via a computer network, the information items presenting unstructured information;

identifying a plurality of sentences in the unstructured information that mention at least two entities;

parsing the plurality of sentences in the unstructured information to obtain parsed sentences representing parts of individual sentences as parse trees;

identifying a plurality of relations in the parsed sentences, wherein respective relations identify a first argument value associated with a first named entity that corresponds to a subject expressed in a respective parsed sentence, a second argument value associated with a second named entity that corresponds to an object expressed in the respective parsed sentence, and a relation value which reflects a corresponding relationship between the first named entity and the second named entity expressed in the respective parsed sentence;

merging synonymous argument values within the plurality of relations to provide a set of argument-merged facts;

forming relation clusters based at least on the argument-merged facts, individual relation clusters grouping together relations associated with a same first argument type identified from the unstructured information, a same second argument type identified from the unstructured information, and a same relation value identified from the unstructured information;

generating confidence score information for the relations in said relation clusters to provide scored relations, the confidence score information reflecting at least a parsing confidence in the parsing of the plurality of sentences to obtain the parse trees;

outputting final extracted facts by selecting a subset of the scored relations based at least on the confidence score information; and providing access to the final extracted facts to one or more knowledge-consuming computer-implemented applications.

16. The method of claim 15, wherein said generating confidence score information comprises:

determining a classification confidence reflecting relative confidence in which the information items are classified as being related to a specific target domain;

determining an entity recognition confidence reflecting relative confidence that the first named entity and the second named entity of each relation are named entities;

determining an entity merging confidence reflecting relative confidence in the merging of the synonymous argument values;

identifying a first number of occurrences of the first named entity of each relation in the collection of information items;

identifying a second number of occurrences of the second named entity of each relation in the collection of information items; and identifying a third number of occurrences of each relation in the collection of information items.

17. The method of claim 15, wherein said merging comprises:

forming a digest of unique argument values that appear in the plurality of relations, to provide a set of itemized entities;

providing pair score information for each pair of a particular first argument value and a particular second argument value within the itemized entities, to overall provide a set of scored entity pairs, each instance of pair score information reflecting an extent to which the particular first argument value is equivalent to the particular second argument value;

using the pair score information associated with the scored entity pairs to identify equivalent argument values, to provide a set of conflated relations; and modifying the plurality of relations by replacing each group of argument values that have been assessed as being equivalent with a canonical argument value, to provide the argument-merged facts.

18. The method of claim 15, wherein said forming comprises:

identifying one or more partitions within the argument-merged facts, each partition grouping together relations associated with a particular same first argument type, and a particular same second argument type;

identifying one or more original clusters associated with each partition, each original cluster being associated with a particular relation value;

identifying, for each partition, at least two clusters, if any, that pertain to a same relation value; and merging, for each partition, said at least two clusters into a single cluster.

19. The method of claim 15, wherein said generating comprises:

generating the confidence score information for each particular relation in said relation clusters based at least on a first set of feature values and a second set of feature values, the first set of feature values including subsystem-originating confidence score information that is provided by one or more prior subsystems in a pipeline of operations performed by the method, and the second set of feature values provides a statistical measure of the occurrence of the particular relation and/or a part thereof within the collection of information items.

20. A computer-readable storage medium storing computer-readable instructions, the computer-readable instructions, when executed by one or more processor devices, performing acts comprising:

receiving a collection of information items from one or more information sources via a computer network, the information items presenting unstructured information;

identifying a plurality of sentences in the unstructured information that mention at least two entities;

parsing the plurality of sentences in the unstructured information to obtain parsed sentences representing parts of individual sentences as parse trees;

identifying a plurality of relations between entities in the parsed sentences, wherein respective relations identify a first argument value associated with a first entity that corresponds to a subject expressed in a respective parsed sentence, a second argument value associated with a second entity that corresponds to an object expressed in the respective parsed sentence, and a relation value which reflects a corresponding relationship between the first entity and the second entity expressed in the respective parsed sentence;

generating confidence score information for individual relations to provide scored relations, the confidence score information reflecting at least a parsing confidence in the parsing of the plurality of sentences to obtain the parse trees; and outputting final extracted facts by selecting a subset of the scored relations based at least on the confidence score information.

* * * * *